(12) United States Patent
Kaida et al.

(10) Patent No.: US 8,133,428 B2
(45) Date of Patent: Mar. 13, 2012

(54) PHOTOCURABLE COMPOSITION, PROCESS FOR PRODUCING FINE PATTERNED PRODUCT AND OPTICAL ELEMENT

(75) Inventors: Yuriko Kaida, Tokyo (JP); Hiroshi Sakamoto, Tokyo (JP); Hirotsugu Yamamoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/659,934

(22) Filed: Mar. 25, 2010

(65) Prior Publication Data

US 2010/0259821 A1 Oct. 14, 2010

Related U.S. Application Data

(63) Continuation of application No. PCT/JP2008/067538, filed on Sep. 26, 2008.

(30) Foreign Application Priority Data

Sep. 28, 2007 (JP) ................................. 2007-255416
Nov. 27, 2007 (JP) ................................. 2007-306402

(51) Int. Cl.
*G02B 1/00* (2006.01)
*G02B 5/30* (2006.01)
*B29C 35/08* (2006.01)
*B29C 33/42* (2006.01)
*C08K 3/36* (2006.01)

(52) U.S. Cl. ............... 264/496; 359/486.01; 359/493.01; 359/483.01; 522/83; 977/887

(58) Field of Classification Search .................. 359/483, 359/486, 483.01, 486.01, 493.01; 428/195; 427/503, 515; 522/83; 264/496; 977/887
See application file for complete search history.

(56) References Cited

U.S. PATENT DOCUMENTS

| | | | |
|---|---|---|---|
| 4,455,205 A | 6/1984 | Olson et al. | |
| 4,855,333 A | 8/1989 | Rudik et al. | |

(Continued)

FOREIGN PATENT DOCUMENTS

JP 60-230102 A 11/1985

(Continued)

OTHER PUBLICATIONS

EP Communication (Supplementary European Search Report) in EP Appln No. 08833490.9 dated Nov. 5, 2010.

(Continued)

*Primary Examiner* — Susan W Berman
(74) *Attorney, Agent, or Firm* — Foley & Lardner LLP

(57) ABSTRACT

To provide a photocurable composition with which a fine pattern molded product on which a fine pattern of a mold is highly precisely transferred can efficiently be produced.

A photocurable composition comprising 100 parts by mass of a photocurable monomer (A), from 5 to 60 parts by mass of a colloidal silica (B) (solid content) having an average particle size of at most 200 nm, and from 0.1 to 10 parts by mass of a photopolymerization initiator (C), wherein the photocurable monomer (A) comprises a multifunctional monomer (A1) having at least 3(meth)acryloyloxy groups in one molecule and a bifunctional monomer (A2) having two (meth)acryloyloxy groups in one molecule, at least one compound belonging to the multifunctional monomer (A1) or the bifunctional monomer (A2) has a hydroxy group, and the ratio of the total amount (mol) of hydroxy groups to the total amount (mol) of the multifunctional monomer (A1) and the bifunctional monomer (A2) is at least 10%.

9 Claims, 4 Drawing Sheets

U.S. PATENT DOCUMENTS

| | | | | |
|---|---|---|---|---|
| 6,534,235 B1* | 3/2003 | Hanabata et al. | ............ | 430/191 |
| 6,932,934 B2* | 8/2005 | Choi et al. | .................. | 264/496 |
| 7,074,463 B2* | 7/2006 | Jones et al. | .................. | 428/1.1 |
| 7,077,992 B2* | 7/2006 | Sreenivasan et al. | ......... | 264/496 |
| 7,220,371 B2 | 5/2007 | Suganuma | | |
| 7,309,517 B2* | 12/2007 | Jones et al. | ................ | 428/1.52 |
| 7,420,005 B2* | 9/2008 | Hojo et al. | ...................... | 522/81 |
| 7,654,715 B1* | 2/2010 | Chen et al. | .................. | 362/552 |
| 2005/0250052 A1* | 11/2005 | Nguyen | ........................ | 430/322 |
| 2007/0260008 A1 | 11/2007 | Saito et al. | | |
| 2008/0018997 A1 | 1/2008 | Kawazu et al. | | |
| 2008/0129931 A1 | 6/2008 | Takahashi et al. | | |
| 2009/0011367 A1* | 1/2009 | Omatsu et al. | ............. | 430/287.1 |
| 2009/0052030 A1 | 2/2009 | Kaida et al. | | |
| 2010/0038831 A1* | 2/2010 | Kawaguchi et al. | .......... | 264/496 |
| 2011/0008577 A1* | 1/2011 | Miyake et al. | ................ | 428/156 |
| 2011/0020617 A1* | 1/2011 | Kawaguchi | ............... | 428/195.1 |

FOREIGN PATENT DOCUMENTS

| | | |
|---|---|---|
| JP | 61-181809 | 8/1986 |
| JP | 7-2913 | 1/1995 |
| JP | 2001-330728 | 11/2001 |
| JP | 2002-12796 | 1/2002 |
| JP | 2002-328222 A | 11/2002 |
| JP | 2004-240297 | 8/2004 |
| JP | 2005-070456 | 3/2005 |
| JP | 2006-003447 | 1/2006 |
| JP | 2006-152074 | 6/2006 |
| WO | WO 2006/035646 A1 | 4/2006 |
| WO | WO-2006/064693 A1 | 6/2006 |
| WO | WO-2008/084856 A1 | 7/2008 |

OTHER PUBLICATIONS

International Search Report in PCT/JP2009/057076 dated Jul. 14, 2009.

U.S. Appl. No. 12/900,272, filed Oct. 7, 2010, Kaida, et al.

* cited by examiner

PHOTOCURABLE COMPOSITION, PROCESS FOR PRODUCING FINE PATTERNED PRODUCT AND OPTICAL ELEMENT

TECHNICAL FIELD

The present invention relates to a photocurable composition, a process for producing a fine patterned product employing the photocurable composition, an optical element comprising the fine patterned product, particularly a wire-grid polarizer.

BACKGROUND ART

In recent years, a method of pressing a mold having a fine pattern on its surface to a substrate to produce a substrate having a reverse pattern to the fine pattern on its surface, so-called nanoimprinting attracts attention. Particularly, attention is paid to a method of pressing and sandwiching a thermosetting composition or a photocurable composition between the surface of a substrate and the pattern surface of a mold, and polymerizing a monomer in the thermosetting composition or the photocurable composition by heating or by irradiation with light to form a fine patterned product comprising a cured product having a surface on which the fine pattern of the mold is transferred, and further separating the cured product from the mold to produce a fine patterned product integrated with the substrate.

As the photocurable composition used for this method, a photocurable composition comprising at least one (meth)acrylate and a photopolymerization initiator has been known (Patent Document 1).

Patent Document 1: JP-A-2006-152074

DISCLOSURE OF THE INVENTION

Problems to be Solved by the Invention

However, when a fine patterned product having protrusions and recesses is to be produced by using the photocurable composition as disclosed in Patent Document 1 or a photocurable composition which is in the market as a photocurable composition to be employed for nanoimprinting, it is difficult to form a high precision fine pattern. The dimensional accuracy of the fine patterned product is low e.g. by a too high viscosity of the photocurable composition, a high polymerization shrinkage of the photocurable composition, insufficient releasability of the cured product from the mold. Particularly, a problem arises such that the dimensional accuracy at the protrusions of the fine pattern is low. Further, if the coefficient of linear expansion of a cured product of the photocurable composition is high, a problem arises such that the dimensional stability of the fine pattern is decreased. Further, in a case where the fine patterned product is used as an optical element, high transparency is also required.

Means to Solve the Problem

The present invention provides a photocurable composition with which a fine patterned product on which a fine pattern of a mold is highly precisely transferred can efficiently be produced. Further, the present invention provides a fine patterned product having high dimensional stability and being excellent in transparency. The present invention provides the following.

A photocurable composition comprising a photocurable monomer (A), a colloidal silica (B) having an average particle size of at most 200 nm and a photopolymerization initiator (C) in contents of the colloidal silica (B) (solid content) of from 5 to 60 parts by mass and the photopolymerization initiator (C) of from 0.1 to 10 parts by mass per 100 parts by mass of the photocurable monomer (A), wherein the photocurable monomer (A) comprises at least the following multifunctional monomer (A1) and the following bifunctional monomer (A2); and at least one compound belonging to the multifunctional monomer (A1) or the bifunctional monomer (A2) has a hydroxy group, and the ratio of the total amount (mol) of the hydroxy groups to the total amount (mol) of the multifunctional monomer (A1) and the bifunctional monomer (A2) is at least 10%:

multifunctional monomer (A1): a compound having at least 3 (meth)acryloyloxy groups in one molecule;

bifunctional monomer (A2): a compound having two (meth)acryloyloxy groups in one molecule.

A fine patterned product, comprising a cured product obtained by curing the above photocurable composition on a fine pattern of a mold having the fine pattern on its surface.

A process for producing a fine patterned product, which comprises sandwiching and pressing the above photocurable composition between a fine pattern surface of a mold having the fine pattern on its surface and a substrate (step A), curing the photocurable composition by irradiation with light to form a fine patterned product comprising a cured product having a surface on which the fine pattern of the mold is transferred (step B), and separating at least one of the mold and the substrate from the cured product to obtain a fine patterned product, a fine patterned product integrated with the substrate, or a fine patterned product integrated with the mold (step C).

A fine patterned product produced by the above production process.

An optical element comprising the above fine patterned product.

EFFECTS OF THE INVENTION

By using the photocurable composition of the present invention, a fine patterned product on which a fine pattern of a mold is highly precisely transferred can efficiently be produced. Accordingly, according to the present invention, highly precise nanoimprinting process is realized. Further, the fine patterned product of the present invention is excellent in dimensional stability and transparency.

MEANINGS OF SYMBOLS

Figure 1:
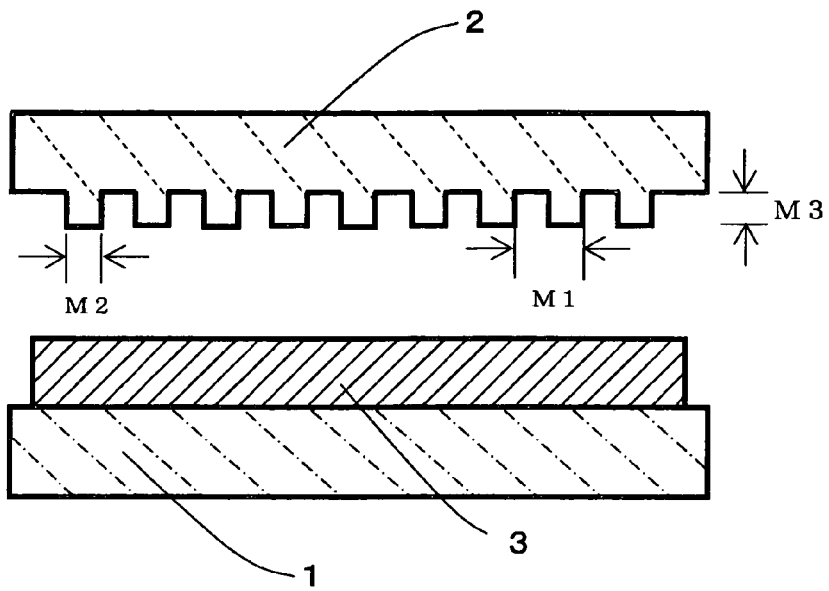
FIG. 1 is a cross sectional view schematically illustrating a state where a photocurable composition 3 is placed on a substrate 1.

1: Substrate
2: Mold
3: Photocurable composition
4: Cured product
10: Wire-grid polarizer
12: Ridge
14: Fine patterned product
16: Fine metallic wire
20: Original mold
30: Cylindrical mold precursor
32: Transparent fluororesin layer
34: Pipe made of acrylic resin
40: Cylindrical mold
42: Transparent fluororesin layer having pattern formed
50: PET film
52: Coating film of photocurable composition
60: Light source

BEST MODE FOR CARRYING OUT THE INVENTION

In the present specification, an acryloyloxy group and a methacryloyloxy group will generically be referred to as a (meth)acryloloxy group, acrylic acid and methacrylic acid will generically be referred to as (meth)acrylic acid, and an acrylate and a methacrylate will generically be referred to as a (meth)acrylate. Functionality meaning the number of functional groups is the number of (meth)acryloyloxy groups per one molecule, unless otherwise specified. Further, the (meth) acrylolyoxy group is represented by the chemical formula $CH_2=C(R)COO-$ (wherein R is a hydrogen atom or a methyl group).

The photocurable composition of the present invention is a photocurable composition comprising a photocurable monomer (A), a colloidal silica (B) having an average particle size of at most 200 nm and a photopolymerization initiator (C). Among them, the photocurable monomer (A) is a monomer which initiates the polymerization reaction by irradiation with light in the presence of the photopolymerization initiator (C) described hereinafter. However, in the present invention, a (meth)acryloyloxy group-containing hydrolyzable silane compound for surface modification of the colloidal silica (B) described hereinafter and the colloidal silica (B) surface-modified therewith is not regarded as a compound corresponding to the photocurable monomer (A) even though it contains a (meth)acryloyloxy group.

In the photocurable composition of the present invention, the photocurable monomer (A) comprises at least the following multifunctional monomer (A1) and the following bifunctional monomer (A2), at least one compound belonging to the multifunctional monomer (A1) or the bifunctional monomer (A2) has a hydroxy group. This free hydroxy group is an alcoholic hydroxy group.

Multifunctional monomer (A1): A compound having at least 3 (meth)acryloyloxy groups in one molecule.

Bifunctional monomer (A2): A compound having two (meth)acryloyloxy groups in one molecule.

At least one compound belonging to the monofunctional monomer (A1) or the bifunctional monomer (A2) has a hydroxy group, and by the presence of hydroxy groups in a certain amount or more in the photocurable monomer (A), even when the photocurable composition of the present invention is in a state where it contains substantially no solvent, the sol is stable and is hardly gelated, whereby precise transfer of a fine pattern is possible.

As the photocurable monomer (A), a photocurable monomer other than the multifunctional monomer (A1) and the bifunctional monomer (A2) may be used. However, in order to sufficiently achieve the object of the present invention, the total amount of the multifunctional monomer (A1) and the bifunctional monomer (A2) is preferably from 80 to 100 mass %, more preferably from 90 to 100 mass % to the total amount of the photocurable monomer (A). Particularly, it is preferred that substantially the entire photocurable monomer (A) comprises the multifunctional monomer (A1) and the bifunctional monomer (A2) except for a functional monofunctional monomer described hereinafter.

The (meth)acryloyloxy group in the multifunctional monomer (A1) or the bifunctional monomer (A2) is preferably a (meth)acryloyloxy group in a (meth)acrylate of an alcohol or a (meth)acryloyloxy group in a (meth)acrylic acid reaction product of an epoxide. It may also be a (meth)acryloyloxy group in a (meth)acrylate of a phenol.

The alcoholic hydroxy group in the multifunctional monomer (A1) or the bifunctional monomer (A2) having a hydroxy group is preferably a hydroxy group which is not esterified in a partial (meth)acrylate of a polyhydric alcohol or a hydroxy group derived from an epoxy group such as a hydroxy group formed by reaction of an epoxy group of an epoxide with a carboxy group of a carboxylic acid. The multifunctional monomer (A1) or the bifunctional monomer (A2) having two or more hydroxy groups may have two types of such hydroxy groups. The hydroxy group derived from an epoxy group may, for example, be a hydroxy group formed together with an ether bond by the reaction of an epoxy group with a hydroxy group-containing compound, in addition to the above.

The multifunctional monomer (A1) is classified into the following categories of compounds.

That is, a compound (A11) having a hydroxy group and having at least 3 (meth)acryloyloxy groups in one molecule, and a compound (A12) having no hydroxy group and having at least 3 (meth)acryloyloxy groups in one molecule.

The bifunctional monomer (A2) is classified into the following categories of compounds.

That is, a compound (A21) having a hydroxy group and having two (meth)acryloyloxy groups in one molecule, and a compound (A22) having no hydroxy group and having two (meth)acryloyloxy groups in one molecule.

As (A11) to (A22), a polyester of a polyhydric alcohol with (meth)acrylic acid is preferred. Among them, a partial polyester (a polyester having a hydroxy group in the polyhydric alcohol remained) corresponds to (A11) or (A21), and a complete polyester (a polyester having no hydroxy group in the polyhydric alcohol remained) corresponds to (A12) or (A22). In the case of production of a polyester by reacting a polyhydric alcohol or its reactive derivative with (meth)acrylic acid or its reactive derivative, it is not easy to product only a complete polyester, and further, production of a mixture of a complete polyester and a partial polyester on purpose is not a rare case. Further, a commercially available multifunctional (meth)acrylate is such a mixture of a complete polyester and a partial polyester in many cases. Such a mixture of a complete polyester and a partial polyester can be used as the multifunctional monomer (A1) or the bifunctional monomer (A2) in the present invention. In such a case, the respective components are classified into (A11) to (A22) and their proportions are obtained by analysis, to determine the amount of use of such components. Here, the reactive derivative of a polyhydric alcohol may, for example, be a metal alkoxide, and the reactive derivative of (meth)acrylic acid may, for example, be an acid chloride.

As (A11) or (A21), a hydroxy group-containing compound formed by the reaction of an epoxy group with an active hydrogen-containing group (such as a hydroxy group or a carboxy group) may also be mentioned. For example, it may be a reaction product of a (meth)acryloyloxy group-containing epoxide with a polyhydric alcohol or with a polyhydric carboxylic acid, or a reaction product of an alcohol having a (meth)acryloyloxy group or (meth)acrylic acid with a polyepoxide (i.e. a compound having at least 2 epoxy groups).

The (meth)acryloyloxy group-containing epoxide may, for example, be glycidyl (meth)acrylate.

The polyhydric carboxylic acid may, for example, be a polycarboxylic acid such as succinic acid or adipic acid.

The alcohol having a (meth)acryloyloxy group may, for example, be the above partial polyester or a hydroxyalkyl (meth)acrylate such as 2-hydroxyethyl (meth)acrylate.

The polyepoxide may, for example, be a polyglycidyl ether, a polyglycidyl ester or a polycycloalkene oxide called (a main agent of) an epoxy resin. It may, for example, be an aromatic polyglycidyl ether such as bisphenol A-diglycidyl ether or novolac-polyglycidyl ether, an aliphatic polyglycidyl ether such as polyalkylene glycol diglycidyl ether, or a polycycloalkene oxide such as vinyl cyclohexene dioxide.

As (A11) to (A22), further, a reaction product of a reactive compound having a (meth)acryloyloxy group may also be mentioned. For example, it may be an ester of an alcohol having a (meth)acyloyloxy group with a carboxylic acid, an ester of a carboxylic acid having a (meth)acryloyloxy group with an alcohol, an urethane product of an isocyanate having a (meth)acryloyloxy group with an alcohol, or a urethane product of an alcohol having a (meth)acryloyloxy group with an isocyanate.

A compound having at least 2 (meth)acryloyloxy groups can be obtained by using a compound having at least 2 (meth) acryloyloxy groups as the reactive compound having a (meth) acryloyloxy group, or by using a compound having at least 2 reactive groups as the compound to be reacted with the reactive compound having a (meth)acryloyloxy group. Further, in a case where a compound having a hydroxy group is used, a compound having a hydroxy group can be obtained by such reaction that a hydroxy group remains.

The polyhydric alcohol may, for example, be the following polyhydric alcohol.

An aliphatic polyhydric alcohol: a diol such as ethylene glycol, propylene glycol, 1,4-butanediol, neopentyl glycol, 1,6-hexanediol, 1,9-nonanediol or 1,10-decanediol; or a trivalent or higher valent aliphatic polyhydric alcohol such as glycerol, trimethylolpropane or pentaerythritol.

A multimer of an aliphatic polyhydric alcohol: polyethylene glycol such as diethylene glycol or triethylene glycol, polypropylene glycol such as dipropylene glycol or tripropylene glycol, or a multimer of another diol; or a multimer of a trivalent or higher valent aliphatic polyhydric alcohol such as diglycerol, triglycerol, ditrimethylolpropane, dipentaerythritol or tripentaerythritol.

A saccharide such as a monosaccharide, a polysaccharide or a sugar alcohol: e.g. fructose, galactose, glucose, sucrose, erythritol or sorbitol.

An alicyclic polyhydric alcohol: e.g. tricyclodecane dimethanol, cyclohexane dimethanol or 2,2-bis(4-hydroxycyclohexyl)propane.

A hydroxy group-containing isocyanurate type polyhydric alcohol: a tris(hydroxyalkyl)isocyanurate such as tris(2-hydroxyethyl)isocyanurate or tris(2-hydroxypropyl)isocyanurate.

An aromatic polyhydric alcohol: e.g. bis(2-hydroxyethyl) bisphenol A, bis(2-hydroxypropyl) bisphenol A or bis(2-hydroxyethyl) bisphenol F.

A polyether polyol made of an alkylene oxide adduct of the above polyhydric alcohol or a polyester polyol made of a cyclic ester adduct of the above polyhydric alcohol: e.g. a trimethylolpropane/ethylene oxide adduct, a trimethylolpropane/propylene oxide adduct, a glycerol/ethylene oxide adduct, a glycerol/propylene oxide adduct, a sorbitol/ethylene oxide adduct or a trimethylolpropane/ε-caprolactone adduct.

As examples of the multifunctional monomer (A11), the following compounds may be mentioned.

Dipentaerythritol penta(meth)acrylate, dipentaerythritol tetra(meth)acrylate, pentaerythritol tri(meth)acrylate, ditrimethylolpropane triacrylate, diglycerol tri(meth)acrylate, a reaction product of glycidyl (meth)acrylate with glycerol, or a reaction product of glycidyl (meth)acrylate with trimethylolpropane.

As examples of the multifunctional monomer (A12), the following compounds may be mentioned.

Dipentaerythritol hexa(meth)acrylate, pentaerythritol tetra (meth)acrylate, trimethylolpropane tri(meth)acrylate, glycerol tri(meth)acrylate, tris(2-(meth)acryloyloxyethyl)isocyanurate, tris(2-(meth)acryloloxypropyl)isocyanurate, tri (meth)acrylate of timethylolpropane/ethylene oxide adduct, tri(meth)acrylate of trimethylolpropane/propylene oxide adduct, hexa(meth)acrylate of dipentaerythritol/caprolactone adduct, and tri(meth)acrylate of tris(2-hydroxyethyl)isocyanurate/caprolactone adduct.

As examples of the bifunctional monomer (A21), the following compounds may be mentioned.

Pentaerythritol diacrylate, glycerol di(meth)acrylate, di(meth)acrylate of a triol made of a condensate of neopentyl glycol with trimethylolpropane, bis(2-(meth)acryloyloxyethyl)-2-hydroxyethylisocyanurate, a (meth)acrylic acid adduct of bisphenol A-diglycidyl ether, a (meth)acrylic acid adduct of vinyl cyclohexene dioxide, a (meth)acrylic acid adduct of dicyclopentadiene dioxide, a reaction product of glycidyl (meth)acrylate with ethylene glycol, a reaction product of glycidyl (meth)acrylate with propylene glycol, a reaction product of glycidyl (meth)acrylate with diethylene glycol, a reaction product of glycidyl (meth)acrylate with 1,6-hexanediol, a reaction product of glycidyl (meth)acrylate with trimethylolpropane, etc.

As examples of the bifunctional monomer (A22), the following compounds may be mentioned.

1,3-Butandiol di(meth)acrylate, 1,4-butanediol di(meth) acrylate, neopentyl glycol di(meth)acrylate, 1,6-hexanediol di(meth)acrylate, 1,9-nonanediol diacrylate, 1,10-decanediol diacrylate, ethylene glycol di(meth)acrylate, diethylene glycol di(meth)acrylate, tricyclodecane dimethanol diacrylate, bis(2-(meth)acryloyloxyethyl) bisphenol A, bis(2-(meth) acryloyloxyethyl) bisphenol S, bis(2-(meth)acryloyloxyethyl) bisphenol F, triethylene glycol di(meth)acrylate, tetraethylene glycol di(meth)acrylate, tripropylene glycol di(meth)acrylate, a polyethylene glycol di(meth)acrylate having a molecular weight of from 200 to 1,000, a polypropylene glycol di(meth)acrylate having a molecular weight of from 200 to 1,000, bis(acryloyloxy neopentyl glycol) adipate, di(meth)acrylate of neopentyl glycol hydroxypivalate, di(meth)acrylate of a neopentyl glycol hydroxypivalate/caprolactone adduct, etc.

The multifunctional monomer (A1) is preferably a polyester of a trivalent or higher valent polyhydric alcohol with (meth)acrylic acid. Among such preferred monofunctional monomers (A1), the multifunctional monomer (A11) which is a multifunctional monomer having a hydroxy group is preferably a partial polyester of a tetravalent or higher valent polyhydric alcohol with (meth)acrylic acid, and the multifunctional monomer (A12) which is a multifunctional monomer having no hydroxy group is preferably a complete polyester of a trivalent or higher valent polyhydric alcohol with (meth)acrylic acid.

The bifunctional monomer (A2) is preferably a polyester of a bivalent or higher valent polyhydric alcohol with (meth)acrylic acid. Among such preferred bifunctional monomers (A2), the bifunctional monomer (A21) which is a bifunctional monomer having a hydroxy group is preferably a partial diester of a trivalent or higher valent polyhydric alcohol with (meth)acrylic acid, and the bifunctional monomer (A22) which is a bifunctional monomer having no hydroxy group is preferably a diester of a bivalent alcohol with (meth)acrylic acid.

As described above, a compound having a hydroxy group belonging to the multifunctional monomer (A1) or the bifunctional monomer (A2) is preferably a hydroxy group-containing poly(meth)acrylate which is a partial esterified product of a trivalent or higher valent polyhydric alcohol with (meth)acrylic acid. Here, since a multifunctional monomer (A1) having a urethane bond tends to have a high viscosity, and water resistance of a cured product thereof tends to be poor, and accordingly the multifunctional monomer (A1) is preferably a compound having no urethane bond.

The number of (meth)acryloyloxy groups in one molecule of the multifunctional monomer (A1) is at least 3, and the upper limit is preferably 20. The number of (meth)acryloyloxy groups is more preferably from 3 to 12, particularly preferably from 3 to 10 in the multifunctional monomer (A11), and from 4 to 12 in the multifunctional monomer (A12). The number of hydroxy groups in one molecule is preferably from 1 to 6, particularly preferably from 1 to 4 in the multifunctional monomer (A11), and from 1 to 4, particularly preferably from 1 to 2 in the bifunctional monomer (A21). Further, the multifunctional monomer (A1) and the bifunctional monomer (A2) preferably have a relatively low molecular weight per (meth)acryloyloxy group, whereby the coefficient of linear expansion of the cured product of the photocurable composition will be low. The molecular weight per one (meth)acryloyloxy group is preferably at most 300, particularly preferably at most 150.

The multifunctional monomer (A1) is preferably a polyester of a trivalent or higher valent polyhydric alcohol or its multimer with (meth)acrylic acid, particularly preferably a polyester of a tetravalent or higher valent polyhydric alcohol selected from pentaerythritol, polypentaerythritol which is a multimer of pentaerythritol, polytrimethylolpropane which is a multimer of trimethylolpropane, and polyglycerol which is a multimer of glycerol, with (meth)acrylic acid. The multimer of a polyhydric alcohol is preferably a dimer to a tetramer. Such a multimer of a polyhydric alcohol is usually obtained as a mixture of a monomer with a multimer, a mixture of multimers differing in the number of condensation, a mixture of a monomer and multimers differing in the number of condensation, or the like, and a polyester with (meth)acrylic acid obtainable by using it is also a similar mixture. Further, a commercially available multifunctional (meth)acrylate is such a mixture of (meth)acrylates differing in the number of functional groups in many cases. A mixture of (meth)acrylates differing in the number of functional groups may be used as the multifunctional monomer (A1) or the bifunctional monomer (A2) in the present invention. In such a case, the respective components are classified into (A11) to (A22) and their proportions are obtained by analysis, to determine the amount of use of such components.

In the present invention, it is required that at least one compound belonging to the multifunctional monomer (A1) or the bifunctional monomer (A2) has a hydroxy group, and the ratio of the total amount (mol) of the hydroxy groups to the total amount (mol) of the multifunctional monomer (A1) and the bifunctional monomer (A2) is at least 10%. If the total amount (mol) of the hydroxy groups is less than 10%, the resulting photocurable composition tends to be gelated, and if it is gelated, it will be impossible to transfer a fine pattern. It is considered that presence of highly motile hydroxy groups contributes to stabilization of a sol in the absence of a solvent. The total amount (mol) of hydroxy groups is preferably at least 12%, more preferably at least 14%. The upper limit of the total amount (mol) of hydroxy groups is preferably 120%, more preferably 50%.

The ratio of the amount (mol) of the bifunctional monomer (A2) to the total amount (mol) of the multifunctional monomer (A1) and the bifunctional monomer (A2) is preferably from 20 to 80%, more preferably from 25 to 75%. If the amount of the multifunctional monomer (A1) is too large, a stress will be applied at the time of the curing reaction, whereby a cured product will be distorted. If the amount of the multifunctional monomer (A1) is too small, the coefficient of linear expansion of a cured product will not sufficiently be low, whereby the dimensional stability may be low.

Each of the multifunctional monomer (A1) and the bifunctional monomer (A2) may be used alone or in combination of two or more, but use of two or more in combination is preferred, whereby it will be easy to adjust the viscosity before curing and to secure the dimensional stability of a cured product. The multifunctional monomer (A1) is preferably a mixture of at least one type of a compound having from 5 to 8 (meth)acryloyloxy groups and at least one type of a compound having from 3 to 4 such groups. Particularly preferred is a mixture of at least one type of compound having 6 (meth)acryloyloxy groups and at least one type of a compound having from 3 to 4 such groups.

The photocurable composition may contain, as the photocurable monomer (A), a monofunctional monomer having one (meth)acryloyloxy group in one molecule. Hereinafter such a photocurable monofunctional monomer will be referred to as a monofunctional monomer (A3). The ratio of the monofunctional monomer (A3) in the total mass of monomers (A) contained in the photocurable composition is preferably less than 20 mass %, more preferably less than 10 mass %. If the ratio of the monofunctional monomer (A3) is high, the coefficient of linear expansion of a cured product may be high, whereby the dimensional stability will be decreased. Here, in a case where such a monofunctional monomer (A3) is a monofunctional monomer having a hydroxy group, the above amount of hydroxy groups means the amount of all hydroxy groups including the hydroxy groups of the hydroxy group-containing monofunctional monomer to the total amount of the multifunctional monomer (A1), the bifunctional monomer (A2) and the monofunctional monomer (A3).

Further, in a case where a functional compounding agent such as a water repellency-imparting agent (D) as described hereinafter is a compound having one (meth)acryloyloxy group in one molecule, such a compound (functional monofunctional monomer) is also regarded as one type of the monofunctional monomer (A3). The ratio of the monofunctional monomer (A3) means the total amount including such a compounding agent.

As the monofunctional monomer having one (meth)acryloyloxy group in one molecule, the following compounds may, for example, be mentioned. Methyl (meth)acrylate, ethyl (meth)acrylate, butyl (meth)acrylate, isobutyl (meth) acrylate, t-butyl (meth)acrylate, 2-ethylhexyl (meth)acrylate, lauryl (meth)acrylate, tridecyl (meth)acrylate, cyclohexyl (meth)acrylate, 2-hydroxyethyl (meth)acrylate, 2-hydroxypropyl (meth)acrylate, glycidyl (meth)acrylate, tetrahydrofurfuryl (meth)acrylate, benzyl (meth)acrylate, 1,4-butylene glycol mono(meth)acrylate, ethoxyethyl (meth)acrylate, and a (meth)acrylic acid adduct of phenyl glycidyl ether.

The photocurable composition of the present invention comprises a colloidal silica (B). The colloidal silica (B) in the photocurable composition of the present invention is in the form of ultrafine particles of silica dispersed in a dispersion medium colloidally. The dispersion medium is not particularly limited but is preferably e.g. water, a lower alcohol or a cellosolve. In the present invention, the amount of use of the colloidal silica (B) means the amount of only the colloidal silica excluding the dispersion medium, and is also called (the amount of) the solid content. As specific dispersion media, water, methanol, ethanol, isopropyl alcohol, n-butanol, ethylene glycol, methyl cellosolve, ethyl cellosolve, butyl cellosolve, propylene glycol monomethyl ether acetate, dimethylacetamide, toluene, xylene, methyl acetate, ethyl acetate, pentyl acetate and acetone may, for example, be mentioned.

The average particle size of the colloidal silica (B) is at most 200 nm so as to suppress optical scattering, and is particularly preferably from 1 to 50 nm. The average particle size refers to the average particle size measured by the dynamic light scattering method.

The colloidal silica (B) may be used after the particle surface is modified by a hydrolyzate of a hydrolyzable silane compound so as to improve the dispersion stability. Here, "the surface is modified by a hydrolyzate" means a state where the hydrolyzate of a hydrolyzable silane compound is physically or chemically bonded to some of or all the silanol groups on the surface of the colloidal silica particles, whereby the surface properties are improved. Such surface modification is easily carried out by subjecting some of or all the hydrolyzable groups of a hydrolyzable silane compound to hydrolysis or to hydrolysis and condensation reaction in the presence of silica particles.

The surface-modified colloidal silica is obtained, for example, by adding a hydrolyzable silane compound to a colloidal silica in a state where dispersed in a dispersion medium, followed by stirring to let the hydrolyzable silane compound be reacted with the surface of the colloidal silica. The content of the colloidal silica (B) in the dispersion medium is preferably from about 5 to about 50 mass %. The reaction may be carried out at a temperature of from room temperature to the boiling point of the dispersion medium, and it is preferably carried out at 50° C. or higher so as to increase the reaction rate. It is preferred that after the reaction, stirring is continued at a temperature lower than the reaction temperature for aging. For example, the reaction is carried out at 50° C. or higher, and then aging is carried out at room temperature. The reaction time is preferably from about 30 minutes to half a day, and the aging time is preferably from about one hour to about one day.

The hydrolyzable silane compound is preferably a silane compound having an organic group (an organic group in which the terminal atom bonded to the silicon atom is a carbon atom) having a functional group such as a (meth)acryloyloxy group, an amino group, an epoxy group or a mercapto group and a hydrolyzable group such as an alkoxy group or a chlorine atom bonded to the silicon atom. Further, it may be a partially hydrolyzed condensate of such a silane compound. As the hydrolyzable silane compound, for example, 3-(meth)acryloyloxypropyltrimethoxysilane, 3-(meth)acryloyloxypropylmethyldimethoxysilane, 2-(meth)acryloyloxyethyltrimethoxysilane, 3-(meth)acryloyloxypropyltriethoxysilane, 2-(meth)acryloyloxyethyltriethoxysilane, 3-aminopropyltriethoxysilane, 3-aminopropyltrimethoxysilane, N-(2-aminoethyl)-3-aminopropylmethyldimethoxysilane, 3-glycidoxypropyltrimethoxysilane or 3-mercaptopropyltrimethoxysilane may preferably be mentioned.

The hydrolyzable silane compound is preferably a hydrolyzable silane compound having a functional group which is easily bonded to the photocurable monomer (A) as a functional group. By bonding of the surface of the colloidal silica particles and the polymer chain of the photocurable monomer (A), such an effect is obtained that the coefficient of linear expansion of a cured product of the photocurable composition is decreased and the dimensional stability is increased.

The functional group of the hydrolyzable silane compound is preferably a mercapto group or a (meth)acryloyloxy group, in view of reactivity with the photocurable monomer (A). With respect to the mercapto group, the reaction will not easily proceed without active energy from the outside, and accordingly the storage stability of the surface-modified colloidal silica particles is good. Here, in the present invention, the colloidal silica surface-modified with a (meth)acryloyloxy group-containing hydrolyzable silane compound is not regarded as a compound corresponding to the photocurable monomer (A). Further, even when a (meth)acryloyloxy group-containing hydrolyzable silane compound is contained in the photocurable composition accompanying the use of such a surface-modified colloidal silica, the (meth)acryloyloxy group-containing hydrolyzable silane compound is not regarded as a compound corresponding to the photocurable monomer (A).

As a mercapto group-containing silane compound (S1) having an organic group having a mercapto group, and a hydrolyzable group or a hydroxy group bonded to the silicon atom, a compound represented by the following formula (S1) is preferred.

$$HS-R^2-SiR^3_r R^4_{3-r} \qquad (S1)$$

wherein $R^2$ is a bivalent hydrocarbon group, $R^3$ is a hydroxy group or a hydrolyzable groups, $R^4$ is a monovalent hydrocarbon group, and r is an integer of from 1 to 3.

In the formula (S1), $R^2$ is preferably a $C_{2-6}$ alkylene group, particularly preferably a $C_3$ alkylene group. $R^4$ is preferably an alkyl group having at most 4 carbon atoms, particularly preferably a methyl group or an ethyl group. $R^3$ is preferably a hydrolyzable group, more preferably a halogen atom or an alkoxy group having at most 4 carbon atoms, particularly preferably an alkoxy group having at most 4 carbon atoms. The halogen atoms is preferably a chlorine atom or a bromine atom. The alkoxy group is more preferably a methoxy group or an ethoxy group in view of good hydrolyzability. r is preferably 2 or 3.

Typical examples of the mercapto group-containing silane compound represented by the above formula are mentioned below. Me represents a methyl group, OMe a methoxy group, OEt an ethoxy group and OPr a n-propoxy group.

HS—CH$_2$CH$_2$CH$_2$—Si(OMe)$_3$, HS—CH$_2$CH$_2$CH$_2$—Si(OEt)$_3$, HS—CH$_2$CH$_2$CH$_2$—Si(OPr)$_3$, HS—CH$_2$CH$_2$CH$_2$—SiMe(OMe)$_2$, HS—CH$_2$CH$_2$CH$_2$—SiMe(OEt)$_2$, HS—CH$_2$CH$_2$CH$_2$—SiMe(OPr)$_2$, HS—CH$_2$CH$_2$CH$_2$—SiMe$_2$(OMe), HS—CH$_2$CH$_2$CH$_2$—SiMe$_2$(OEt), HS—CH$_2$CH$_2$CH$_2$—SiMe$_2$(OPr), HS—CH$_2$CH$_2$CH$_2$—SiCl$_3$, HS—CH$_2$CH$_2$CH$_2$—SiBr$_3$, HS—CH$_2$CH$_2$CH$_2$—SiMeCl$_2$, HS—CH$_2$CH$_2$CH$_2$—SiMeBr$_2$, HS—CH$_2$CH$_2$CH$_2$—SiMe$_2$Cl, and HS—CH$_2$CH$_2$CH$_2$—SiMe$_2$Br.

Further, as a (meth)acryloyloxy group-containing silane compound (S2) having an organic group having a (meth)acryloyloxy group, and a hydrolyzable group or a hydroxy group bonded to the silicon atom, a compound represented by the following formula (S2) is preferred.

$$CH_2=C(R)COO-R^5-SiR^6_yR^7_{3-y} \quad (S2)$$

wherein R is a hydrogen atom or a methyl group, $R^5$ is a bivalent hydrocarbon group, $R^6$ is a hydroxy group or a hydrolyzable group, $R^7$ is a monovalent hydrocarbon group, and y is an integer of from 1 to 3.

In the formula (S2), $R^5$ is preferably a $C_{2-6}$ alkylene group, particularly preferably a $C_3$ alkylene group. $R^6$ is preferably a hydrolyzable group, more preferably a halogen atom or an alkoxy group having at most 4 carbon atoms, particularly preferably an alkoxy group having at most 4 carbon atoms. The halogen atom is preferably a chlorine atom or a bromine atom. The alkoxy group is more preferably a methoxy group or an ethoxy group in view of good hydrolyzability. $R^7$ is preferably an alkyl group having at most 4 carbon atoms, particularly preferably a methyl group or an ethyl group. y is preferably 2 or 3.

Typical examples of the (meth)acryloyloxy group-containing silane compound (S2) represented by the above formula are mentioned below.

CH$_2$=C(R)COO—CH$_2$CH$_2$CH$_2$—Si(OMe)$_3$, CH$_2$=C(R)COO—CH$_2$CH$_2$CH$_2$—Si(OEt)$_3$, CH$_2$=C(R)COO—CH$_2$CH$_2$CH$_2$—Si(OPr)$_3$, CH$_2$=C(R)COO—CH$_2$CH$_2$CH$_2$—SiMe(OMe)$_2$, CH$_2$=C(R)COO—CH$_2$CH$_2$CH$_2$—SiMe(OEt)$_2$, CH$_2$=C(R)COO—CH$_2$CH$_2$CH$_2$—SiMe(OPr)$_2$, CH$_2$=C(R)COO—CH$_2$CH$_2$CH$_2$—SiMe$_2$(OMe), CH$_2$=C(R)COO—CH$_2$CH$_2$CH$_2$—SiMe$_2$(OEt), CH$_2$=C(R)COO—CH$_2$CH$_2$CH$_2$—SiMe$_2$(OPr), CH$_2$=C(R)COO—CH$_2$CH$_2$CH$_2$—SiCl$_3$, CH$_2$=C(R)COO—CH$_2$CH$_2$CH$_2$—SiBr$_3$, CH$_2$=C(R)COO—CH$_2$CH$_2$CH$_2$—SiMeCl$_2$, CH$_2$=C(R)COO—CH$_2$CH$_2$CH$_2$—SiMeBr$_2$, CH$_2$=C(R)COO—CH$_2$CH$_2$CH$_2$—SiMe$_2$Cl, CH$_2$=C(R)COO—CH$_2$CH$_2$CH$_2$—SiMe$_2$Br.

The amount of the colloidal silica (B) blended is from 5 to 60 parts by mass as the solid content per 100 parts by mass of the photocurable monomer (A), whereby polymerization shrinkage at the time of curing tends to be suppressed, and formation with excellent accuracy tends to be possible. If it is less than 5 parts by mass, the polymerization shrinkage tends to be significant, whereby the transfer accuracy will be lowered, and if it exceeds 60 parts by mass, the viscosity of the composition will be increased, whereby transfer will be impossible. It is particularly preferably from 10 to 50 parts by mass. In a case where the surface-modified colloidal silica is used, the solid content amount is the solid content amount of the colloidal silica after modified.

The photocurable composition comprises a photopolymerization initiator (C).

As specific examples of the photopolymerization initiator (C), an aryl ketone photopolymerization initiator (such as an acetophenone, a benzophenone, an alkylaminobenzophenone, a benzyl, a benzoin, a benzoin ether, a benzyl dimethyl ketal, a benzoyl benzoate, or an α-acyloxime ester), a sulfur-containing photopolymerization initiator (such as a sulfide or a thioxanthone), an acylphosphine oxide (such as acyl-diarylphosphine oxide), or other polymerization initiators may be mentioned. The photopolymerization initiators may be used in combination of two or more of them. Further, the photopolymerization initiator may be used in combination with a photosensitizer such as an amine. The amount of the photopolymerization initiator (C) blended is from 0.1 to 10 parts by mass per 100 parts by mass of the photocurable monomer (A). It is particularly preferably from 0.5 to 5 parts by mass. Within such a range, sufficient curing properties are obtained, and the entire photopolymerization initiator (C) tends to be decomposed at the time of curing.

As a specific photopolymerization initiator, for example, the following compounds may be mentioned, but it is not limited thereto.

4-Phenoxydichloroacetophenone, 4-t-butyldichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methyl-propan-1-one, 1-hydroxycyclohexylphenylketone and 2-methyl-1-{4-(methylthio)phenyl}-2-morpholinopropan-1-one.

Benzyl, benzoin, benzoin methyl ether, benzoin ethyl ether, benzoin isopropyl ether, benzoin isobutyl ether, benzyl dimethyl ketal, benzophenone, benzoyl benzoate, benzoylmethyl benzoate, 4-phenylbenzophenone, hydroxybenzophenone, benzophenone acrylate, 3,3'-dimethyl-4-methoxybenzophenone, 3,3',4,4'-tetrakis(t-butylperoxycarbonyl)benzophenone, 9,10-phenanthrenequinone, camphorquinone, dibenzosuberone, 2-ethylanthraquinone, 4',4"-diethylisophthalophenone, (1-phenyl-1,2-propanedione-2-(O-ethoxycarbonyl)oxime), α-acyloxime ester, and methylphenyl glyoxylate.

4-Benzoyl-4'-methyldiphenyl sulfide, thioxanthone, 2-methylthioxanthone, 2,4-dimethylthioxanthone, 2-chlorothioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, benzoyldiphenylphosphine oxide, 2,6-dimethylbenzoyldiphenylphosphine oxide, and bis(2,6-dimethoxybenzoyl)-2,4,4-trimethylpentylphosphine oxide.

The photocurable composition preferably further contains a water repellency-imparting agent (D). Water repellency of the surface of a cured product of the photocurable composition will be improved, whereby mold release properties will be excellent, and the cured product will smoothly be separated from the mold. In the present invention, the water repellency-imparting agent (D) means a compound having, as a group exhibiting water repellency (a water repellent group), a silicone chain (polydiorganosiloxane chain), a long chain polyfluoroorganic group or both of them. This water repellency-imparting agent (D) preferably has a photocurable group such as a (meth)acryloyloxy group. The water repellency-imparting agent (D) having a (meth)acryloyloxy group is covalently bonded with other components in the photocurable composition at the time of the curing reaction, whereby the water repellency-imparting agent (D) is fixed on the surface of a cured product of the photocurable composition and will not be volatilized. Accordingly, the surface of the cured product exhibits water repellency for a long period of time. As mentioned above, in the present invention, the water repellency-imparting agent (D) having a (meth)acryloyloxy group is regarded as one type of a compound corresponding to the photocurable monomer (A). For examples, the water repellency-imparting agent (D) having one (meth)acryloyloxy group is one type of the monofunctional monomer (A3).

The organic group bonded to the silicon atom in a silicone chain is preferably an alkyl group, a polyfluoroalkyl group or a phenyl group, and one silicone chain may have two or more types of such groups. A preferred silicone chain is a polydiorganosiloxane chain represented by the following formula (D1).

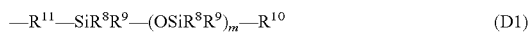
$$-R^{11}-SiR^8R^9-(OSiR^8R^9)_m-R^{10} \quad (D1)$$

In the above formula, each of $R^8$ and $R^9$ which are independent of each other, is a $C_{1-8}$ alkyl group, a $C_{1-8}$ fluorinated alkyl group or a phenyl group, $R^{10}$ is a $C_{1-8}$ alkyl group which may contain an etheric oxygen atom, $R^{11}$ is a $C_{2-8}$ alkylene group which may contain an etheric oxygen atom, and m is an integer of from 1 to 1,000. $R^8$'s and $R^9$'s in the respective siloxane units may be the same or different. Each of $R^8$ and $R^9$ is more preferably a methyl group, a phenyl group or a $C_{1-8}$ polyfluoroalkyl group, and it is particularly preferred that they are both a methyl group. $R^{10}$ is preferably a $C_{1-4}$ alkyl group, particularly preferably a methyl group. $R^{11}$ is preferably a $C_{2-4}$ polymethylene group (particularly trimethylene group) or a $C_{3-6}$ alkylene group having one etheric oxygen atom. m is preferably from 2 to 500.

The long chain polyfluoroorganic group is preferably a long chain polyfluoroorganic group having a moiety at which at least 4 perfluorinated carbon atoms are connected (provided that an etheric oxygen atom may be present between carbon atoms), such as a perfluoroalkylene group having at least 4 carbon atoms or a perfluoro(polyoxyalkylene) chain having at least 4 carbon atoms.

The long chain polyfluoroorganic group is preferably a perfluoroalkyl group having at least 4 carbon atoms, a perfluoro(polyoxyalkylene) group having at least 2 perfluorooxyalkylene groups selected from a perfluorooxyethylene group and a perfluorooxypropylene group repeated, or a monovalent organic group in which a perfluoroalkyl group is bonded to one terminal of the above perfluoro(oxyalkylene) group and a mono- or polyoxyalkylene group is bonded to the other terminal, or the like. The long chain polyfluoroorganic group is preferably a long chain polyfluoroorganic group represented by the following formula (D2) or formula (D3).

$$-R^{12}-R^{f1} \quad (D2)$$

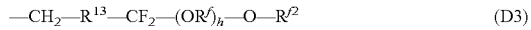
$$-CH_2-R^{13}-CF_2-(OR^f)_h-O-R^{f2} \quad (D3)$$

In the above formulae, $R^f$ is a perfluoroalkylene group having 2 or 3 carbon atoms, $R^{f1}$ is a $C_{4-20}$ perfluoroalkyl group, $R^{f2}$ is a $C_{1-20}$ perfluoroalkyl group, $R^{12}$ is a $C_{1-6}$ alkylene group, $R^{13}$ is a single bond, a $C_{1-5}$ alkylene group or a $C_{1-5}$ fluoroalkylene group, and h is an integer of from 1 to 100.

$R^f$ is preferably a tetrafluoroethylene group or a hexafluoropropylene group. $R^{f1}$ is preferably a $C_{4-12}$ linear perfluoroalkyl group, and $R^{f2}$ is preferably a $C_{1-12}$ perfluoroalkyl group. $R^{f1}$ is preferably $CF_3(CF_2)_3-$ or $CF_3(CF_2)_5-$, and $R^{f2}$ is preferably $CF_3-$, $CF_3CF_2-$, $CF_3(CF_2)_2-$, $CF_3(CF_2)_3-$ or $CF_3(CF_2)_5-$. $R^{12}$ is preferably a $C_{2-4}$ alkylene group, and $R^{13}$ is preferably a group represented by $-(CH_2)_k-(CF_2)_j-$ or a single bond (k and j are each independently an integer of from 0 to 2).

In the water repellency-imparting agent (D) having a (meth)acryloyloxy group, the group represented by the above (D1) to (D3) and the (meth)acryloyloxy group may be directly bonded or may be bonded via an organic group containing a urethane bond. Further, between the group represented by (D1) to (D3) and the (meth)acryloyloxy group or the organic group containing a urethane bond, a polyether chain or a polyester chain may be present. When such a chain is present, compatibility with the photocurable monomer (A) will be improved. The polyether chain is preferably a polyoxyethylene chain, a polyoxypropylene chain or a poly(oxyethylene/oxypropylene) chain, and the polyester chain is preferably a polyester chain formed by the ring-opening addition reaction of a cyclic ester (particularly ε-caprolactone). The organic group containing a urethane bond is preferably a group formed by reacting an isocyanate alkyl (meth)acrylate (particularly 2-isocyanate ethyl methacrylate) with a compound having a hydroxy group at its terminal containing the group represented by (D1) to (D3). The polyether chain or the polyester chain is preferably one formed by ring-opening addition reaction of an alkylene oxide or a cyclic ester to a compound having a hydroxy group at its terminal containing the group represented by (D1) to (D3). The water repellency-imparting agent (D) having no (meth)acryloyloxy group may, for example, be a hydroxy group-containing compound before introduction of the (meth)acryloyloxy group, a compound having an acyloxy group having no unsaturated group introduced instead of the (meth)acryloyloxy group, or a compound obtained by reacting an isocyanate compound having no unsaturated group.

A particularly preferred compound as the water repellency-imparting agent (D) having a (meth)acryloyloxy group is a compound represented by the following formula (D4). Here, $R^8$, $R^9$, $R^{10}$, $R^{f2}$ and m are as defined above.

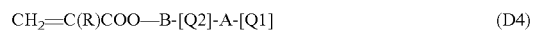
$$CH_2=C(R)COO-B-[Q2]-A-[Q1] \quad (D4)$$

In the formula,
[Q1]: $-CH_2CH_2CH_2-SiR^8R^9-(OSiR^8R^9)_m-R^{10}$,
$-CH_2CF_2-(OC_2F_4)_n-O-R^{f2}$ or
$-CH_2C_2F_4-(OC_3F_6)_n-O-R^{f2}$
[Q2]: $-(C_pH_{2p}C(=O)O)_q-$ or
$-(CH_2CH_2O)_z-(CH(CH_3)CH_2O)_w-$
A: a single bond or $-CH_2CH_2O-$.
B: $-CH_2CH_2NHC(=O)O-$ or a single bond.
n: an integer of from 1 to 100.
p: an integer of from 3 to 5, and q: an integer of from 1 to 20.
z: an integer of from 0 to 100, and w: an integer of from 0 to 100, provided that $5 \leq z+w \leq 100$ is satisfied.

n is preferably from 2 to 50. As described above, m is preferably from 2 to 500. When m and n are within such ranges, an resulting cured product will be excellent in water repellency. The compound (D4) has a function to exhibit compatibility with other compounds in the photocurable composition by having the moiety [Q2]. q is more preferably an integer of from 2 to 10. z and w are more preferably integers such that z is from 0 to 80 and w is from 0 to 80, provided that $5 \leq z+w \leq 80$ is satisfied. Within such ranges, the compound (D4) has proper compatibility with other components in the photocurable composition. That is, if the compatibility is too high, the compound (D4) is less likely to be localized on the surface of a coating film, and the surface of the cured product cannot exhibit sufficient water repellency. If the compatibility is too low, transparency of the cured product will be impaired.

The compound (D4) is prepared as follows. For example, to a hydroxy group of a polydimethyl silicone having a hydroxy group at one terminal, lactone is polymerized as it is, or lactone is popolymerized after ethylene carbonate is added. Further, to the hydroxy group present at the terminal of the product, a (meth)acryloyloxy group is introduced using (meth)acrylic acid or (meth)acrylic acid chloride by means of an ester bond, or a (meth)acryloyloxy group is introduced using 2-isocyanate ethyl (meth)acrylate by means of a urethane bond. Otherwise, for example, to a terminal hydroxy group of a polyoxytetrafluoroethylene compound having a hydroxy group (provided that the carbon atom to which the hydroxy group is bonded is a carbon atom of a hydrocabon group such as a methylene group) on one terminal and a perfluoroalkyl group on the other terminal, lactone is polymerized as it is or lactone is polymerized after ethylene carbonate is added. Further, to the hydroxy group present at the terminal of the product, a (meth)acryloyloxy group is introduced using (meth)acrylic acid or (meth)acrylic acid chloride by means of an ester bond, or a (meth)acryloyloxy group is introduced using 2-isocyanate ethyl (meth)acrylate by means of a urethane bond.

The amount of the water repellency-imparting agent (D) blended is preferably from 0.02 to 10 parts by mass, more preferably from 0.05 to 5 parts by mass per 100 parts by mass of the photocurable monomer (A). Within such a range, the transparency of a cured product of the photocurable composition will not be impaired, and the surface of the cured product will be excellent in water repellency. In the case of the water repellency-imparting agent (D) having no (meth)acryloyloxy group, the amount is preferably smaller (from 0.02 to 5 parts by mass) within the above range, particularly preferably from 0.05 to 3 parts by mass.

The photocurable composition preferably contains a polymerization inhibitor (E) so as to secure the storage stability and to suppress undesired polymerization in the coating process. As specific examples of the polymerization inhibitor (E), N-nitrosophenylhydroxyamine and N-nitrosophenylhydroxyamine aluminum complex may be mentioned. The amount of the polymerization inhibitor (E) blended is preferably from 0.1 to 10 parts by mass per 100 parts by mass of the photocurable monomer (A). Within such a range, excellent storage stability and process stability are obtained, and favorable photocurability is obtained.

The photocurable composition may contain, in addition to the above components, at least one functional compounding agent selected from the group consisting of an ultraviolet absorber, a light stabilizer, an antioxidant, a thermal polymerization inhibitor, an antifoaming agent, a thickener, an anti-settling agent, a pigment (an organic coloring pigment, an inorganic pigment), a coloring dye, an infrared absorber, a fluorescent brightening agent, a dispersant, electrically conductive fine particles, an antistatic agent, an anti-fogging agent and a coupling agent, as the case requires.

The ultraviolet absorber is preferably a benzotriazole ultraviolet absorber, a benzophenone ultraviolet absorber, a salicylic acid ultraviolet absorber, a phenyltriazine ultraviolet absorber or the like which is commonly used as an ultraviolet absorber for a synthetic resin. The light stabilizer is preferably a hindered amine light stabilizer which is commonly used as a light stabilizer for a synthetic resin. The antioxidant may, for example, be a hindered phenol antioxidant such as 2,6-di-t-butyl-p-cresol or a phosphorus antioxidant such as triphenylphosphine. As such a functional compounding agent, a compound having one (meth)acryloyloxy group belonging to the monofunctional monomer (A3) is preferred. The functional compounding agent belonging to the monofunctional monomer (A3) is covalently bonded to other components at the time of the curing reaction of the photocurable composition and is thereby fixed in a cured product of the photocurable composition, whereby it is less likely to bleed out to the surface. Specifically, an ultraviolet absorber such as 2-{2-hydroxy-5-(2-acryloyloxyethyl)phenyl}benzotriazole or 2-hydroxy-3-methacryloyloxypropyl-3-(3-benzotriazole-4-hydroxy-5-t-butylphenyl)propionate or a hindered amine light stabilizer such as N-methyl-4-methacryloyloxy-2,2,6,6-tetramethylpiperidine may, for example, be mentioned.

The thermal polymerization inhibitor may, for example, be hydroquinone monomethyl ether. The thickener may, for example, be a polymethyl methacrylate polymer, a hydrogenated castor oil compound or a fatty acid amido compound. The organic coloring pigment may, for example, be a condensed polycyclic organic pigment or a phthalocyanine organic pigment. The inorganic pigment may, for example, be titanium dioxide, cobalt oxide, molybdenum red or titanium black. Further, the coloring dye may, for example, be an organic solvent-soluble azo metal complex salt dye or an organic solvent-soluble phthalocyanine dye. The infrared absorber may, for example, be a polymethine, phthalocyanine, metal complex, aminium, diimonium, anthraquinone, dithiol metal complex, naphthoquinone, indolphenol, azo or triaryl methane compound.

The electrically conductive fine particles may, for example, be a metal powder of e.g. zinc, aluminum or nickel, ferrous phosphide or antimony-doped tin oxide. The antistatic agent may, for example, be a nonionic antistatic agent, a cationic antistatic agent or an anionic antistatic agent. The coupling agent may, for example, be a silane coupling agent or a titanate coupling agent.

In the photocurable composition of the present invention, the total amount of components (including the water repellency-imparting agent (D) and the polymerization inhibitor (E) other than the essential three components of the photocurable monomer (A), the colloidal silica (B) and the photopolymerization initiator (C) is preferably at most 20 mass % to the photocurable composition. However, this photocurable composition is one not containing the following solvent. Particularly, it is preferably at most 10 mass % based on the photocurable composition.

The viscosity of the photocurable composition of the present invention containing substantially no solvent at 50° C. is preferably from 1 to 200 mPa/s, more preferably at most 150 mPa/s, particularly preferably at most 120 mPa/s. When the photocurable composition is used for production of a fine patterned product by nanoimprinting, the photocurable composition is sandwiched as pressed to a mold in a state where it contains substantially no solvent. Accordingly, the viscosity of the photocurable composition containing substantially no solvent is preferably within the above range. "Containing substantially no solvent" means that the amount of the solvent is less than 5 mass % to the entire amount of the photocurable composition.

For the purpose of improving coating properties of the photocurable composition and the adhesion to the substrate surface, a solvent may be incorporated in the photocurable composition. The photocurable composition containing a solvent will hereinafter be referred to as a photocurable composition solution. The solvent is not particularly limited so long as there is no problem in the solubility of the photocurable monomer (A), the photopolymerization initiator (C) and other additives, and so long as the above performance is satisfied. Further, two or more solvents may be used in combination. The amount of the solvent used is preferably at most 100 times by mass, particularly preferably at most 50 times, to the photocurable monomer (A).

The solvent may preferably be a solvent such as a lower alcohol such as ethyl alcohol, butyl alcohol or isopropyl alcohol, a ketone such as methyl isobutyl ketone, methyl ethyl ketone or acetone, an ether such as dioxane, diethylene glycol dimethyl ether, tetrahydrofuran or methyl-t-butyl ether, a cellosolve such as methyl cellosolve, ethyl cellosolve, butyl cellosolve or propylene glycol monomethyl ether acetate. Further, an ester such as n-butyl acetate, isoamyl acetate or diethylene glycol monoacetate, a polyfluoroaliphatic hydrocarbon such as polyfluorohexane, a polyfluoroaliphatic hydrocarbon such as polyfluoromethylcyclohexane or polyfluoro-1,3-dimethylcyclohexane, a polyfluoroaromatic hydrocarbon such as bis(trifluoroomethyl)benzen, a chlorinated hydrocarbon such as methylene chloride, or a hydrocarbon such as toluene, xylene or hexane, or the like may also be used. Such solvents may be used as a mixture of two or more of them.

In a case where a solvent is blended with the photocurable composition of the present invention, it is preferred to select a proper solvent depending on the type of a substrate to which the photocurable composition is applied. For example, in a case where the substrate is a stretched PET, a lower alcohol, a cellosolve, an ester, an ether or a mixture thereof is suitable.

The photocurable composition of the present invention is preferably used for such an application that it is applied to the substrate surface to form a coating film, followed by photocuring. The coating film of the photocurable composition can be formed by various coating methods. Further, in a case where a solution of the photocurable composition of the present invention is used, a coating film of the photocurable composition solution is formed by a similar coating method, and then the solvent is removed by volatilization (hereinafter sometimes referred to as drying) to obtain a coating film of the photocurable composition containing substantially no solvent. Then, the coating film of the photocurable composition is irradiated with light to photocure the photocurable composition. The coating method may, for example, be a method such as dipping, spin coating, flow coating, spraying, bar coating, gravure coating, roll coating, blade coating or air knife coating.

As a light source, ultraviolet rays, electron rays, X-rays, radioactive rays and high-frequency waves may, for example, be preferably mentioned, and ultraviolet rays having a wavelength of from 180 to 500 nm are economically preferred. As the light source, an ultraviolet irradiation apparatus such as a xenon lamp, a low-pressure mercury lamp, a high-pressure mercury lamp, an ultrahigh-pressure mercury lamp, a metal halide lamp, a carbon-arc lamp or a tungsten lamp, an electron ray irradiation apparatus, an X-ray irradiation apparatus or a high-frequency waves irradiation apparatus may, for example, be used.

The light irradiation time may properly be changed depending on conditions such as the type of the photocurable monomer (A), the type of the photopolymerization initiator (C), the thickness of the coating film and the light source. Usually, the object is achieved by irradiation for from 0.1 to 60 seconds, and proper irradiation time may be determined by experiments. Further, for the purpose of completing the curing reaction, heat treatment may be carried out after light irradiation.

As the above substrate, substrates made of various materials can be used. For example, a substrate made of an inorganic material such as a glass substrate, a quartz substrate, a metal substrate, a silicon substrate or a ceramic substrate, a substrate made of an organic material such as plastic substrate, or a substrate made of a composite of such materials, may, for example, be mentioned. The thickness of the substrate is not limited, and the substrate may be a substrate in the form of a thin film. In a case where the photocurable composition is photocured between two substrates, at least one substrate is required to be transparent to light. After the photocurable composition is photocured on a substrate or between two substrates, a film of a cured product (hereinafter sometimes referred to as a cured film) may be separated from the substrate. The surface of the substrate to be separated preferably has a releasable surface. The substrate from which the cured film is not separated preferably has a surface having improved adhesion to the cured film. Such properties of the substrate surface can be imparted by surface treating the substrate surface.

The thickness of the cured film obtainable by curing the photocurable composition of the present invention varies as desired. Usually a cured film having a thickness of from 0.1 to 50 μm is preferred, and it is particularly preferred to form a cured film having a thickness of from 0.2 to 10 μm.

With the photocurable composition of the present invention, the following properties are likely to be obtained.

A refractive index ($n_d$) of a cured product of from 1.3 to 1.6.

A visible light transmittance of at least 92% when the thickness of a cured product is 200 μm.

A contact angle on the surface of a cured product to water at room temperature of at least 90° initially and at least 85° after the moisture resistance test (60° C., 90% Rh, 500 hours).

A coefficient of linear expansion of a cured product from −50° C. to 200° C. of at most 100 ppm/° C.

The refractive index ($n_d$) is measured with respect to a cured product having a thickness of 10 μm using an Abbe refractometer (589 nm, 25° C.).

The visible light transmittance is obtained from the ratio of a light T2 transmitted through a sample to a total quantity of light T1 (T2×100/T1) with respect to light at from 400 nm to 780 nm using an integration type light transmittance meter.

The contact angle to water is measured by using a contact angle measuring apparatus.

The cured product obtained by curing the photocurable composition of the present invention is preferably a fine patterned product. The photocurable composition of the present invention is preferably used as a photocurable composition to provide a fine patterned product obtained in such a manner that a mold having a fine pattern on its surface is pressed to a coating film of the photocurable composition of the present invention to transfer the fine pattern of the mold, followed by light irradiation to form a cured product thereby to provide a fine patterned product having a reverse pattern to the fine pattern on its surface. The mold may be the above substrate having a fine pattern on its surface or may be one different from the substrate. Hereinafter one having a fine pattern on its surface will be referred to as a mold, and one having no fine pattern on its surface will be referred to as a substrate, regardless of whether it is the above substrate or not.

The present invention further provides a fine patterned product comprising a cured product obtained by curing the photocurable composition on a fine pattern of a mold having the fine pattern on its surface. By the photocurable composition being cured in a state where it is in contact with the fine concavo-convex pattern on the mold surface, a fine patterned product comprising a cured product having a fine pattern reverse to the mold fine pattern (concavo-convex pattern reverse to the concavo-convex pattern of the mold) on its surface can be obtained.

The fine patterned product is preferably produced by sandwiching and pressing the photocurable composition between a mold and a substrate or between two molds and photocuring the photocurable composition in such a state. More specifically, in the same manner as in the method of forming a coating film of the photocurable composition on the substrate, a coating film of the photocurable composition is formed on the surface of a mold or a substrate, and then the other mold or substrate is pressed to the surface of the coating film to sandwich the photocurable composition, and the photocurable composition is photocured in such a state. Particularly, it is preferred to form a coating film of the photocurable composition on the substrate surface, and then to press a mold to the surface of the coating film to sandwich the photocurable composition, and to photocure the photocurable composition in such a state.

The fine patterned product not only is the cured product by itself of the photocurable composition separated from the substrate or the mold but is integrated with the substrate or the mold used for its preparation. That is, it may be one in a state where the substrate or the mold is attached to one side or both sides of the fine patterned product. In a case where the fine patterned product is used in a state where the substrate or the mold is attached, the contact surface between the fine patterned product and the substrate or the mold preferably has high bonding strength. On the contrary, in a case where at least one of the substrate and the mold is separated from the fine patterned product, the surface of the substrate or the mold to be separated preferably has sufficient releasability.

As the substrate for the fine patterned product, the above substrate may be used. Particularly, a glass substrate or a plastic substrate is preferred. The substrate is determined considering the transparency, the dimensional stability, the releasability, abrasion resistance, etc. as the case requires. Specifically, in the case of a plastic substrate, a substrate made of a material such as an aromatic polycarbonate resin, a polymethyl methacrylate resin, a polymethacrylimide resin, a polystyrene resin, a polyvinyl chloride resin, an unsaturated polyester resin, a polyolefin resin, a cyclic polyolefin resin, an ABS resin or an MS (methyl methacrylate/styrene) resin may, for example, be mentioned. Further, in a case where the substrate is to be separated later or in a case where the fine patterned product is used as a reflective element, the substrate may be an opaque ceramic substrate or a metal substrate. In a case where the substrate is to be separated later, a surface treatment may preliminarily be applied to the substrate surface to make it releasable. Further, in a case where the substrate is not to be separated, surface treatment (e.g. silane coupling treatment or silazane treatment) to increase adhesion may preliminarily be applied to the surface of the substrate.

The mold may, for example, be a mold made of a non-transparent material such as a silicon wafer, SiC, mica or a metal, or a mold made of a transparent material such as glass, quartz or a transparent plastic. However, at least one of the combination of the substrate and the mold or the combination of two molds is required to be transparent to light irradiated for photocuring. In the same manner as in the case of the substrate, in a case where the mold is to be separated later, surface treatment may preliminarily be applied to the mold surface to make it releasable, and in a case where the mold is not to be separated, surface treatment to increase adhesion may preliminarily be applied to the surface of the mold.

In a case where the substrate or the mold is to be separated after photocuring of the photocurable composition and it is made of a transparent material, as such a transparent plastic material, a transparent silicone resin such as polydimethylsiloxane or a transparent fluororesin is preferred. These are a material having high transparency and being excellent in releasability. The substrate or the mold made of such a material may be such that the whole is made of such a material or it has a layer of such a material on the surface in contact with the photocurable composition. Particularly, a transparent fluororesin is excellent in transparency and releasability, and its releasability will not be decreased even after repeated use, and accordingly it is preferred as a surface material of the mold having a fine pattern.

The above transparent fluororesin is a fluoropolymer having a fluorinated alicyclic structure in its main chain, and the fluoropolymer is an amorphous or non-crystalline polymer and has high transparency. "Having a fluorinated alicyclic structure in its main chain" means that at least one carbon atom constituting the fluorinated alicyclic ring in the polymer is a carbon atom constituting the main chain of the polymer. Atoms constituting the fluorinated alicyclic ring may include an oxygen atom, a nitrogen atom and the like in addition to the carbon atoms. A preferred fluorinated alicyclic ring is a fluorinated alicyclic ring having one to two oxygen atoms. The number of atoms constituting the fluorinated alicyclic ring is preferably from 4 to 7. The carbon atoms constituting the main chain are derived from carbon atoms in a polymerizable double bond in the case of a polymer obtained by polymerizing a cyclic monomer, or derived from four carbon atoms in two polymerizable double bonds in the case of a polymer obtained by cyclopolymerization of a diene monomer.

The cyclic monomer is a monomer having a fluorinated alicyclic ring and having a polymerizable double bond in the carbon atom-carbon atom constituting the fluorinated alicyclic ring, or a monomer having a fluorinated alicyclic ring and having a polymerizable double bond between a carbon atom constituting the fluorinated alicyclic ring and a carbon atom outside the fluorinated alicyclic ring. The diene monomer is a monomer having two polymerizable double bonds. In the cyclic monomer or the diene monomer, the proportion of the number of fluorine atoms bonded to carbon atoms to the total number of hydrogen atoms bonded to carbon atoms and fluorine atoms bonded to carbon atoms is preferably at least 80%, particularly preferably 100%. The cyclic monomer may, for example, be perfluoro(2,2-dimethyl-1,3-dioxol) or perfluoro (2-methylene-1,3-dioxolane). The cyclopolymerizable diene monomer may, for example, be perfluoro-3-oxa-1,6-heptadiene or perfluoro-3-oxa-1,5-hexadiene. As a mold using such a transparent fluororesin, a mold as disclosed in WO2006/059580 may be mentioned.

The process for producing the fine patterned product of the present invention is preferably a process comprising at least the following steps A, B and C.

In the step A, the photocurable composition of the present invention is sandwiched and pressed between a fine pattern of a mold having the fine pattern on its surface and the surface of a substrate. In the following step B, the photocurable composition is cured by irradiation with light to form a fine patterned product comprising a cured product having a surface on which the fine pattern of the mold is transferred. In the following step C, at least one of the mold and the substrate is separated from the cured product to obtain a fine patterned product, a fine patterned product integrated with the substrate, or a fine patterned product integrated with the mold. Further, in a step D as the case requires, the fine patterned product is separated from the substrate or the mold to obtain a separated fine patterned product.

Now, a preferred production process of the present invention will be described with reference to drawings.

FIG. 1 is a cross sectional view schematically illustrating a state where a photocurable composition 3 is placed on a substrate 1, and a mold 2 having a fine pattern formed thereon is placed on the photocurable composition 3.

Figure 2:
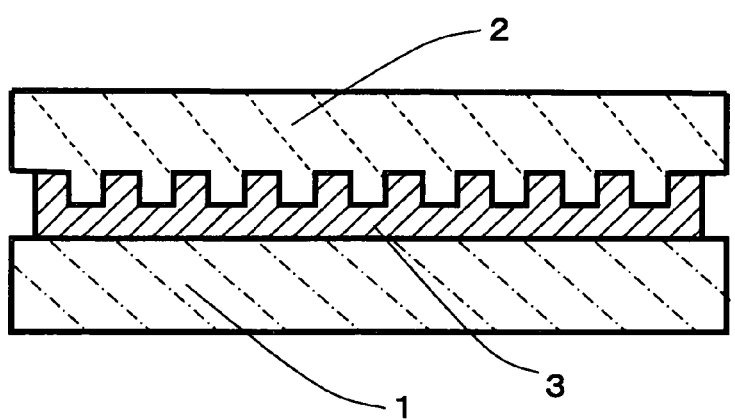
FIG. 2 is a cross sectional view schematically illustrating a state where the photocurable composition 3 is sandwiched and pressed between the substrate 1 and a mold 2.

FIG. 2 is a cross sectional view schematically illustrating a state where the photocurable composition 3 is sandwiched and pressed between the substrate 1 and the mold 2, and the surface of the photocurable composition 3 is deformed in a concavo-convex shape.

FIG. 1 and FIG. 2 illustrate the above step A.

To place a photocurable composition on a substrate, specifically, the following method may be mentioned.

As shown in FIG. 1, a photocurable composition is placed on a substrate surface, and a mold is pressed to the substrate side so that the photocurable composition is in contact with the pattern surface of the mold. Otherwise, reversely, a photocurable composition may be placed on the pattern surface of a mold, and then a substrate is pressed to the mold side so that the photocurable composition is in contact with the substrate. Otherwise, a substrate and a mold are preliminarily combined to form a space between the substrate surface and the pattern surface of the mold, and then a photocurable composition is injected into the space to fill the space and pressed between the substrate and the mold. Otherwise, a photocurable composition may be pressed to a substrate and a mold utilizing an injection pressure.

In a case where the photocurable composition is placed on the substrate surface or the pattern surface of the mold in a thin film form, in addition to the above coating method, a method such as a potting method, a casting method, a Langmuir-Blodgett method or a vacuum deposition method may be employed. The photocurable composition may be applied to the entire surface of the substrate or may be applied only to a part of the substrate. The pressing pressure (gauge pressure) when the substrate and the mold are pressed is preferably at most 10 MPa, more preferably from 0.1 to 5 MPa. As a method of injecting the photocurable composition into the space between the substrate and the mold to fill the space, a method similar to a vacuum injection method or a pressurized injection method commonly employed for a liquid crystal display device may be employed. Otherwise, an injection method employing a capillary action may be employed.

Figure 3:
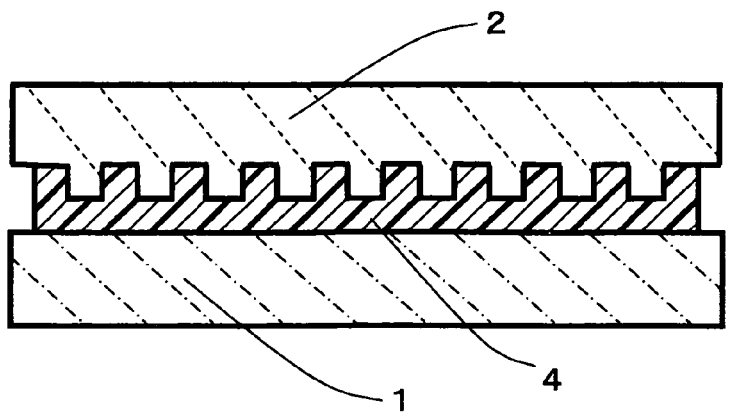
FIG. 3 is a cross sectional view schematically illustrating a state where the photocurable composition 3 is cured to obtain a cured product 4.

FIG. 3 is a front view illustrating a state where the photocurable composition is irradiation with light and is cured to obtain a cured product 4. FIG. 3 illustrates the step B.

The curing of the photocurable composition by irradiation with light in the step B may be carried out, in a case where a mold made of a transparent material is used, by a method of light irradiation from the mold side, and in a case where a substrate made of a transparent material is used, a method of light irradiation from the substrate side. The light to be applied may be a light having a wavelength with which the photocurable composition to be used is cured as described above, and usually a light at from 200 to 400 nm is preferably used. As a light source for light irradiation, a high-pressure mercury lamp or the like is used.

The photocurable composition of the present invention tends to have a low viscosity and high curability, and accordingly it is preferred to carry out the step A or the step B in a low temperature range, i.e. at from 0 to 60° C. Further, a cured product of the composition has high releasability and can be smoothly separated from the mold, and accordingly it is preferred to carry out the step C or the step D also in a low temperature range, i.e. at from 0 to 60° C. Accordingly, all the steps of the production process of the present invention can be carried out in a low temperature range, i.e. at from 0 to 60° C., such being advantageous.

Figure 4:
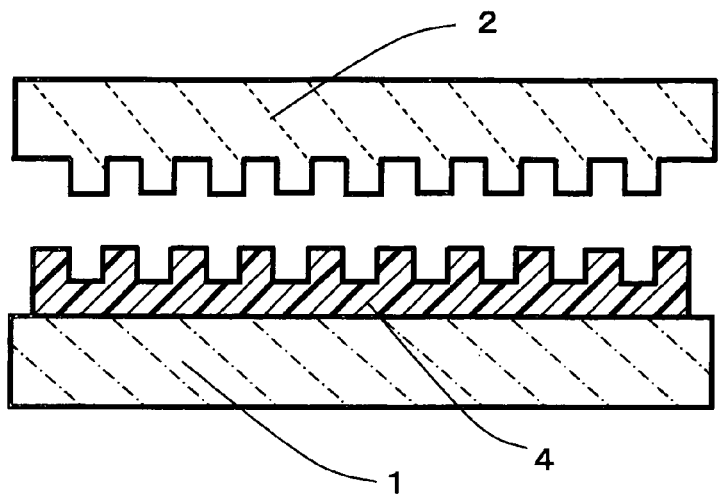
FIG. 4 is a cross sectional view schematically illustrating a state where the mold 2 is separated from the cured state.

FIG. 4 is a front view illustrating a state where the mold 2 is separated from the cured state. FIG. 4 illustrates the step C. FIG. 4 illustrates a state where the cured product 4 is attached to the substrate 1, and only the mold 2 is separated. In such a state, a fine patterned product having the cured product 4 attached to the substrate 1 is obtained.

Figure 5:
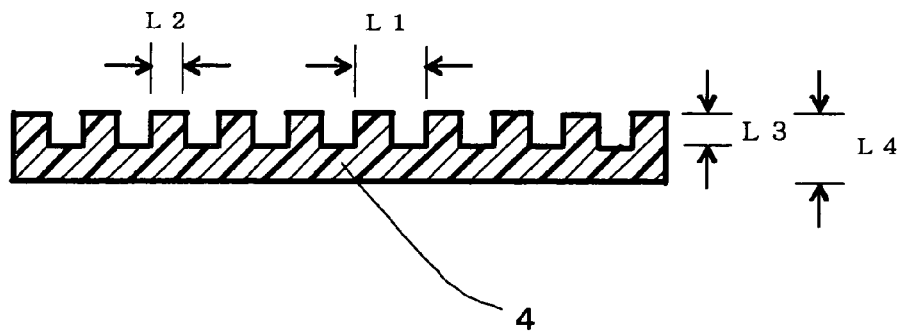
FIG. 5 is a cross sectional view schematically illustrating a state of the cured product 4 alone after the substrate 1 is separated from the cured product 4.

FIG. 5 is a front view illustrating a state of the cured product 4 alone after the substrate 1 is separated from the cured product 4. FIG. 5 illustrates the step D. FIG. 5 illustrates a state of the cured product 4 alone after the cured product 4 is separated from the substrate 1. In such a state, a fine patterned product consisting of the cured product 4 alone is obtained.

The fine patterned product of the present invention may be used as an optical element in the form of the fine patterned product with the cured product 4 adhered to the substrate 1 as shown in FIG. 4, or may be used as an optical element in the form of a fine patterned product consisting of only the cured product 4 alone after the substrate 1 is separated, as shown in FIG. 5. The cured product 4 integrated with the mold may also be used.

In addition to the above, a process for continuously producing a long fine patterned product using a mold in the form of a roll or a conveyor is also possible. Further, the fine patterned product separated as described above may be laminated on another element such as a phase plate, a diffraction grating, a polarizing plate or a lens.

In the case of using a mold in the form of a roll, the mold preferably has releasability. For example, a roll-form mold having release treatment applied to its surface, or a roll-form mold having a release layer on its surface may be mentioned.

The roll-form mold having release treatment applied to its surface may, for example, be a roll-form mold made of a metal, a rubber, a resin or a ceramic and having its surface treated with a release agent.

The roll-form mold having a release layer on its surface may, for example, be a roll-form mold made of a metal, a rubber, a resin or a ceramic and having a release-treated layer on its surface. The release-treated layer may be a layer having a small surface tension (a covering layer made of e.g. a fluororesin, a silicone resin, a polyolefin resin or an oligomer thereof; a metal composite oxide layer formed by e.g. plating, deposition, plasma or baking, or a ceramic layer).

Particularly preferred is a roll-form mold having a covering layer made of a fluororesin excellent in releasability. As a method of producing such a mold, a method of coating the surface of a roll with a fluororesin and forming a fine pattern on the fluororesin layer; or a method of coating the surface of a film (e.g. PET or polyimide) or a metal foil with a fluororesin, forming a fine pattern on the fluororesin layer, and bonding the film or the metal foil having the fluororesin layer to a roll, may be mentioned.

The fine pattern in the present invention is a fine pattern having protrusions and recesses on its surface, and is particularly preferably a fine pattern in which protrusions and recesses are repeatedly formed, and the average of the distances between two protrusions is from 1 nm to 500 μm. In the fine pattern, the average of the distances (L1) between two protrusions is preferably from 1 nm to 100 μm, particularly preferably from 10 nm to 10 μm. The average of the widths (L2) of the protrusions is preferably from 1 nm to 50 μm, particularly preferably from 10 nm to 5 μm. The average of the heights (L3) of the protrusions is preferably from 1 nm to 100 μm, particularly preferably from 10 nm to 10 μm. The thickness (L4) of the fine patterned product consisting of the cured product 4 alone is the total thickness of the height (L3) of the protrusions and the thickness of the main body of the fine patterned product, and the thickness (L4-L3) of the main body of the fine patterned product is preferably at least 10 nm, and the upper limit is not limited. Particularly, the thickness (L4-L3) of the main body of the fine patterned product is preferably equal to or more than the average of the heights (L3) of the protrusions at that point, and is more preferably equal to or more than the average of the heights (L3) of the protrusions at that point and 100 nm or more. The upper limit of the thickness (L4-L3) of the main body of the fine patterned product is not limited, but if it is too thick, problems may arise such as a decrease in the light transparency of the cured product and an increase in the influence of thermal expansion. Accordingly, the upper limit of such a thickness is preferably 1 mm, particularly preferably 500 μm.

The shape of the protrusions may, for example, be a column, a prism, a triangular pyramid, a polyhedron or a hemisphere. The cross sectional shape of the protrusions may, for example, be a rectangular cross section, a triangular cross section or a hemisphere cross section.

In the present invention, a fine pattern can highly precisely be transferred to the cured product even when the minimum size of the fine pattern of the mold is at most 50 μm, at most 500 nm in a smaller case, or even at most 50 nm in a further smaller case. The minimum size of the fine pattern means a minimum value among the height of the protrusion of the mold, the width of the protrusion and the width of the recess. The lower limit of the minimum size is not particularly limited and is preferably 1 nm.

The process for producing the fine patterned product of the present invention is photoimprinting, and accordingly the number of production steps is small as compared with conventional lithography, and a fine patterned product can be produced with good productivity with a large area.

The fine patterned product obtained by the production process of the present invention has a surface on which a fine pattern of a mold is highly precisely transferred. The fine patterned product is useful as an optical element such as a microlens array, an optical waveguide element, an optical switching element, a Fresnel zone plate element, a binary optical element, a blaze optical element or a photonic crystal, an antireflection member, a biochip member, a microreactor chip member, a catalyst support member, etc.

The fine patterned product obtained by the production process of the present invention from the photocurable composition of the present invention is particularly useful as a wire-grid polarizer.

When the refractive index (nd) of a cured film of the photocurable composition of the present invention is at most 1.6, the transparency to p-polarized light in a blue region will be high, and a high polarization separation ability is obtained in a wide range.

When the visible light transmittance of a cured film of the photocurable composition of the present invention is at least 92%, the transparency to p-polarized light will be high, and the polarization separation ability will be high.

When the contact angle of a cured film of the photocurable composition of the present invention to water is at least 90°, when ridges are formed by photoimprinting, the releasability from a mold will be good, transfer with high precision will be possible, and an obtainable wire-grid polarizer will sufficiently exhibit aimed performance.

Figure 6:
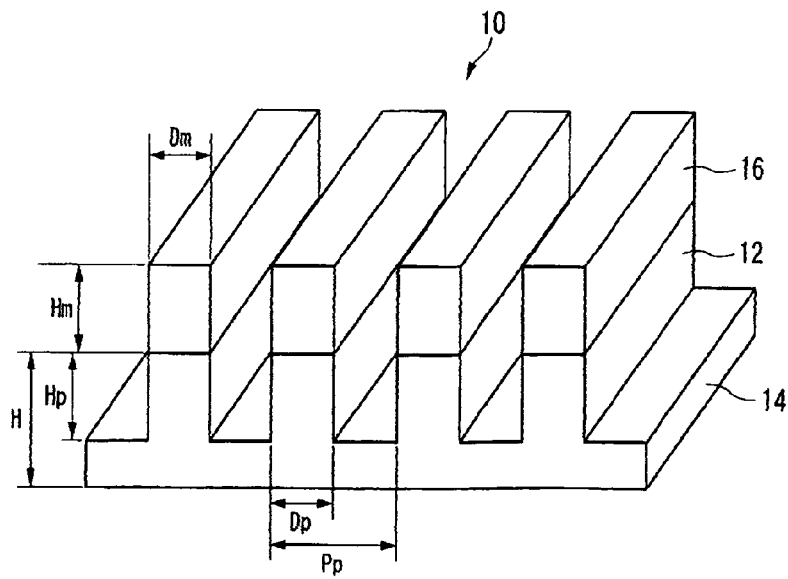
FIG. 6 is a perspective view illustrating one example of a wire-grid polarizer 10 of the present invention.

FIG. 6 is a perspective view showing one example of a wire-grid polarizer of the present invention. A wire-grid polarizer 10 has a fine patterned product 14 made of a photocured resin having a surface on which a plurality of parallel ridges 12 are formed at a constant pitch Pp, and fine metallic wires 16 formed on the ridges 12 on the fine patterned product 14.

The pitch Pp of the ridges 12 is the total of a width Dp of a ridge 12 and a width of a groove formed between the ridges 12. The pitch Pp of the ridges 12 is preferably at most 300 nm, more preferably from 50 to 200 nm. By making the pitch Pp at most 300 nm, the wire-grid polarizer 10 shows sufficiently high reflectance, and shows a high polarization separation ability even in a short wavelength region of about 400 nm. Further, coloring effect due to diffraction can be suppressed.

The ratio (Dp/Pp) of the width Dp to the pitch Pp of the ridge 12 is preferably from 0.1 to 0.6, more preferably from 0.25 to 0.55. By making Dp/Pp at least 0.1, the polarization separation ability of the wire-grid polarizer 10 becomes sufficiently high. By making Dp/Pp at most 0.6, coloring of transmitted light due to interference can be suppressed.

The height Hp of the ridge 12 is preferably from 50 to 500 nm, more preferably from 60 to 300 nm. By making the height Hp at least 50 nm, selective forming of fine metallic wires 16 on the ridges 12 becomes easy. By making the height Hp at most 500 nm, incident angle dependence of polarization degree of the wire-grid polarizer 10 becomes small.

The width Dm of the fine metallic wire 16 is preferably the same as the width Dp of the ridge 12.

The height Hm of the fine metallic wire 16 is preferably from 30 to 300 nm, more preferably from 50 to 200 nm. By making the height Hm at least 30 nm, the wire-grid polarizer 10 shows sufficiently high reflectance and polarization separation ability. By making the height Hm at most 300 nm, light utilization efficiency increases.

The thickness H of the fine patterned product 14 is preferably from 0.5 to 100 μm, more preferably from 0.6 to 50 μm, particularly preferably from 0.8 to 20 μm.

Fine metallic wires are formed only on ridges, and substantially no fine metallic wire is formed in grooves between the ridges. Since the fine metallic wires are formed only on the ridges, the refractive index of a wire-grid polarizer becomes not the refractive index of a cured product of the photocurable composition in the ridges concealed by the fine metallic wires, but the refractive index of air present in the grooves between the ridges. Accordingly, the maximum wavelength of Reyleigh resonance becomes shorter than that of a conventional wire-grid polarizer having fine metallic wire formed on a flat substrate, and polarization separation ability in shorter wavelength side improves.

The material of fine metallic wires is, from the viewpoints of high reflectance for visible light, low absorption of visible light and high electrical conductivity, preferably silver, aluminum, chromium or magnesium, particularly preferably aluminum.

The cross sectional shape of the fine metallic wires may be a square, a rectangle, a trapezoid, a circle, an ellipse or other various shapes.

The fine metallic wires have very small thickness and width, and the performance of a wire-grid polarizer is deteriorated by a slight damage of the fine metallic wires. Further, rust of the fine metallic wires decreases their electrical conductivity, and deteriorates the performance of the wire-grid polarizer. Accordingly, in order to prevent damage and rust of the fine metallic wires, the fine metallic wires may be covered by a protection layer.

The method for forming the fine metallic wires 16 may, for example, be a vapor deposition method, a sputtering method or a plating method, and from the viewpoint of selectively forming the fine metallic wires 16 on the ridges 12, an oblique deposition method is preferred. When the pitch is narrow and the height of ridges is high as in the present invention, by carrying out an oblique deposition at a sufficiently low angle, it is possible to form a metal layer selectively on the ridges 12. Further, by forming a thin metal layer by the oblique deposition method, and subsequently overlaying another metal layer by a plating method, it is also possible to form fine metallic wires having a desired thickness.

The wire-grid polarizer of the present invention described above has a fine patterned product having a surface on which a plurality of parallel ridges are formed at a constant pitch, and fine metallic wires formed on the ridges on the fine patterned product, and accordingly, the polarizer shows high polarization separation ability in a visible light region. Further, since the fine patterned product is made of a photocurable composition, excellent heat resistance and durability are achieved.

EXAMPLES

Now, the present invention will be described with reference to Examples of the present invention (Examples 1 to 30 and 52 to 57) and Comparative Examples (Examples 31 to 51), but the present invention is by no means restricted thereto. Compositions of photocurable compositions in Examples 1 to 57 are shown in Tables 1 and 2. Various physical properties in Examples were measured and evaluated by the following methods. The results in Examples 1 to 57 are shown in Tables 3 to 5.

Measurement and Evaluation of Photocurable Composition
[Ratio of Hydroxy Groups]

The ratio (%) of the total amount (mol) of hydroxy groups to the total amount (mol) of the multifunctional monomer (A1) and the bifunctional monomer (A2) in the photocurable composition was calculated from the blend ratio of starting materials and shown in Table 2 (represented as "OH"). In Examples 40 to 50 in which the photocurable composition contains no bifunctional monomer (A2), representation of the ratio of hydroxy groups was omitted.

[Ratio of Bifunctional Monomer (A2)]

The ratio (%) of the amount (mol) of the bifunctional monomer (A2) to the total amount (mol) of the multifunctional monomer (A1) and the bifunctional monomer (A2) in the photocurable composition was calculated from the blend ratio of starting materials. In Table 2, it was represented as "A2/(A1+A2)".

[Ratio of Colloidal Silica (B)]

The ratio of the colloidal silica (B) (solid content) per 100 parts by mass of the photocurable monomer (A) was calculated and represented as "B/A" in Table 3.

[Viscosity]

The viscosities (mPas) of the photocurable composition containing substantially no solvent at 25° C. and 50° C. were measured using an E type viscometer (manufactured by TOKIMEC INC., TVE-20L). In Examples 1 to 30, the viscosity at 50° C. was measured only when the viscosity at 25° C. exceeded 200 mPa·s.

Measurement and Evaluation of Cured Film
[Refractive Index]

Measured with respect to a cured film (thickness: 10 μm) using an Abbe refractometer (589 nm, 25° C.).

[Haze]

The haze (%) was measured with respect to a cured film (thickness: 200 μm) using a haze meter (HAZE-GARDII, manufactured by Toyo Seiki Seisaku-sho, Ltd.).

[Transmittance]

The transmittance (%) was obtained from the ratio (T2/T1×100) of the light T2 transmitted through a sample to the total quantity of light T1 of light at from 400 nm to 780 nm, with respect to a cured film (thickness: 200 μm) using an integration type light transmittance measuring apparatus.

[Contact Angle]

Using an automatic contact angle meter (DSA10D02, manufactured by KRÜSS GmbH), a droplet (3 λL) of distilled water was formed on a needle tip in a dry state (20° C., relative humidity: 65%), which was brought into contact with the surface of a cured film to form a droplet. The angle (°) of an angle formed by the solid surface and a tangent line to the liquid surface at a point where the solid and the liquid were in contact with each other, including the liquid, was measured. Further, the contact angle was measured with respect to an initial sample and a sample after the moisture resistance test (stored in a wet environment at 60° C. under a relative humidity of 95% for 500 hours).

[Coefficient of Linear Expansion]

Temperature increase and temperature decrease at a temperature of from −50° C. to 200° C. were carried out with respect to a cured film (thickness: 100 μm) using a load-deflection test apparatus (TMA-50 manufactured by Shimadzu Corporation) to measure the coefficient of linear expansion (ppm/° C.).

Measurement and Evaluation of Fine Patterned Product
[Durability Test]

The fine patterned product was stored at high temperature under high humidity (60° C., 90% RH) for 1,000 hours using a constant temperature and humidity chamber (PH-2KT manufactured by Tabai ESPEC). Occurrence of crackings and white turbidity were observed visually and by a microscope.

Measurement and Evaluation of Wire-Grid Polarizer
[Optical Properties]

p-Polarized light and s-polarized light were permitted to enter into the wire-grid polarizer using an ultraviolet and visible spectrophotometer (manufactured by JASCO Corporation), and the transmittance (Tp %) of the p-polarized light at from 450 nm to 700 nm and the reflectance (Rs %) of the s-polarized light were measured. Further, the transmittance (Ts %) of the s-polarized light was also measured, and the extinction ratio (ER) was calculated based on the following formula.

$$\text{Extinction ratio } (ER) = 10 \times \log_{10}(Tp/Ts)$$

Starting materials were as follows.
(1) Photocurable Monomer (A)

DPH: "NK Ester A-DPH" (manufactured by Shin-Nakamura Chemical Co., Ltd.)

According to the $^1$H-NMR analysis by the present inventors, dipentaerythritol pentaacrylate and dipentaerythritol hexaacrylate were contained in a molar ratio of 41:59.

TMP: "NK Ester AD-TMP" (manufactured by Shin-Nakamura Chemical Co., Ltd.)

According to the analysis by the present inventors, ditrimethylol propane triacrylate and ditrimethylol propane tetraacrylate were contained in a molar ratio of 36:64.

TMM3L: "NK Ester A-TMM-3L" (manufactured by Shin-Nakamura Chemical Co., Ltd.)

According to the analysis by the present inventors, pentaerythritol diacrylate and pentaerythritol triacrylate were contained in a molar ratio of 42:58.

TMMT: "NK Ester A-TMMT" (manufactured by Shin-Nakamura Chemical Co., Ltd.)

According to the analysis by the present inventors, pentaerythritol triacrylate and pentaerythritol tetraacrylate were contained in a molar ratio of 15:85.

TMPT: "NK Ester A-TMPT" (manufactured by Shin-Nakamura Chemical Co., Ltd.), trimethylol propane triacrylate.

NPG: "NK Ester A-NPG" (manufactured by Shin-Nakamura Chemical Co., Ltd.), neopentyl glycol diacrylate.

HD: "NK Ester A-HD-N" (manufactured by Shin-Nakamura Chemical Co., Ltd.), 1,6-hexanediol diacrylate.

DOD: "NK Ester A-DOD-N" (manufactured by Shin-Nakamura Chemical Co., Ltd.), 1,10-decanediol diacrylate.

NOD: "NK Ester A-NOD-N" (manufactured by Shin-Nakamura Chemical Co., Ltd.), tricyclodecane dimethanol diacrylate.

DCP: "NK Ester A-DCP" (manufactured by Shin-Nakamura Chemical Co., Ltd.), tricyclodecane dimethanol diacrylate EA-5520: "NK Oligo EA-5520" (manufactured by Shin-Nakamura Chemical Co., Ltd.), 1,4-butanediol diglycidyl ether diacrylate.

EA-1020: "NK Oligo EA-1020" (manufactured by Shin-Nakamura Chemical Co., Ltd.), bisphenol A epoxy diacrylate.

AAE-100: "BLEMMER AAE-100" (manufactured by NOF CORPORATION), diethylene glycol monoacrylate.

C12Ac: "BLEMMER LA" (manufactured by NOF CORPORATION), lauryl acrylate.

C16Ac: "BLEMMER CA" (manufactured by NOF CORPORATION), cetyl acrylate.

B18A: "BLEMMER B18A" (manufactured by NOF CORPORATION), 2-stearyl icosyl acrylate.

AAE-300: "BLEMMER AAE-300" (manufactured by NOF CORPORATION), hexaethylene glycol monoacrylate.

ALE-200: "BLEMMER ALE-200" (manufactured by NOF CORPORATION), lauroxy tetraethylene glycol monoacrylate.

U-15HA: Urethane acrylate which is a reaction product of dipentaerythritol polyacrylate having a hydroxy group with partially nurated hexamethylene diisocyanate (containing 15 acryloyloxy groups on average per molecule).

(2) Colloidal Silica (B)

B-1: Obtained by adding 2.5 parts by mass of 3-mercaptopropyl trimethoxysilane to 100 parts by mass of ethyl cellosolve dispersed colloidal silica (silica content: 30 mass %, average particle size: 11 nm), followed by stirring under heating at 80° C. in a stream of nitrogen for 5 hours, and then carrying out aging at room temperature for 12 hours. The solid content concentration was 30%.

B-2: Obtained by adding 2.5 parts by mass of 3-methacryloyloxy trimethoxysilane to 100 parts by mass of ethyl cellosolve dispersed colloidal silica (silica content: 30 mass %, average particle size: 11 nm), followed by stirring under heating at 80° C. in a stream of nitrogen for 5 hours, and then carrying out aging at room temperature for 12 hours. The solid content concentration was 30%.

(3) Photopolymerization Initiator (C)

C-1: "IRGACURE907" (manufactured by Ciba Specialty Chemicals)

C-2: "IRGACURE184" (manufactured by Ciba Specialty Chemicals)

C-3: "IRGACURE754" (manufactured by Ciba Specialty Chemicals)

C-4: "IRGACURE2959" (manufactured by Ciba Specialty Chemicals)

C-5: "IRGACURE127" (manufactured by Ciba Specialty Chemicals)

(4) Water Repellency-Imparting Agent (D)

D-1: Into a 300 mL four-necked flask equipped with a stirrer and a condenser, titanium tetraisobutoxide (80 mg), dimethyl silicone oil having a hydroxy group on one terminal ("X-22-170BX" manufactured by Shin-Etsu Chemical Co., Ltd., hydroxy value: 18.5) (100 g) and ε-caprolactone (25 g) were put and stirred at 150° C. for 5 hours to obtain a compound in the form of a white wax, having ε-caprolactone ring-opening added to one terminal of the dimethyl silicone oil. The average degree of polymerization of caprolactone was 6.6.

The obtained compound was cooled to room temperature, butyl acetate (50 g) and 2,6-di-t-butyl-p-cresol (250 mg) were added, followed by stirring for 30 minutes, and then 2-isocyanate ethyl methacrylate (5.05 g) was added, followed by stirring at room temperature further for 24 hours to obtain a compound having its terminal modified by a methacryloyloxy group. The number average molecular weight was about 3,750.

(5) Polymerization Inhibitor (E)

E-1: "Q1301" (manufactured by Wako Pure Chemical Industries, Ltd.).

Example 1

Example 1-1

Example for Preparation of Photocurable Composition

Into a 1,000 mL four-necked flask equipped with a stirrer and a condenser, monomer (DPH) (60 g), monomer (NPG) (40 g), photopolymerization initiator (C-1) (1.3 g), water repellency-imparting agent (D-1) (0.13 g), polymerization inhibitor (E-1) (1.0 g) and cyclohexanone (65.0 g) were put, and stirred for one hour at room temperature in a light shielded state for homogenization. Then, with stirring, 100 g of colloidal silica (B-1) (solid content of 30 g) was slowly added, followed by stirring for one hour at room temperature in a light shielded state for homogenization. Then, cyclohexanone (340 g) was added, followed by stirring at room temperature in a light shielded state for one hour to obtain a solution of a photocurable composition 1.

Example 1-2

Example for Formation of Cured Film

On the surface of a substrate made of a glass plate (100 mm×100 mm) having a thickness of 0.5 mm, the obtained solution of the photocurable composition 1 was applied (1,000 rpm×10 seconds) by using a spin coater and held in a circulating hot air oven at 90° C. for one minute and dried to form a coating film of the photocurable composition 1. Then, using a high-pressure mercury lamp, ultraviolet rays of 1,200 mJ/cm$^2$ (the integrated energy amount of ultraviolet rays in a wavelength region of from 300 to 390 nm, the same applies hereinafter) were applied to cure the coating film thereby to form a cured film having a thickness of 200 μm. In the same manner, a cured film having a thickness of 100 μm and a cured film having a thickness of 10 μm were formed. With respect to the cured films integrated with the glass plate, the evaluation results were shown in Table 3.

Example 1-3

Example 1 for Production of Fine Patterned Product

As a mold having a concavo-convex structure on its surface, a mold (20 mm square) made of quartz was used. The mold has a concavo-convex structure in a lattice shape (in FIG. 1, M1=500 nm, M2=250 nm, M3=350 nm. The ridges have a length of 10 mm in the depth direction in FIG. 1. The cross sectional shape of the ridges at a right angle to the longitudinal direction is rectangular) formed in a 10 mm square at the center on its surface.

On the surface of a substrate made of a highly transparent PET film ("Teijin Tetoron O3" manufactured by Teijin DuPont Films Japan Limited (20 mm×20 mm)) having a thickness of 100 µm, the solution of the photocurable composition 1 was applied (1,000 rpm×10 seconds) by using a spin coater and held in a circulating hot air oven at 90° C. for one minute and dried to form a coating film of the photocurable composition 1.

Then, the mold made of quartz was pressed to the coating film of the photocurable composition 1 on the PET film as shown in FIGS. 1 and 2 and pressed as it was under 0.5 MPa (gauge pressure).

Then, at 25° C., a high-pressure mercury lamp was applied for 15 seconds from the mold side to obtain a cured product of the photocurable composition 1. The mold was separated from the cured product to obtain a fine patterned product having a cured product of the photocurable composition 1 having a concavo-convex structure reverse to the concavo-convex structure of the mold on its surface, formed on the PET film. The thickness (L4 in FIG. 5, the same applies hereinafter) of the obtained fine patterned product was 1 µm. Further, it was possible to separate the cured product from the PET substrate to obtain a fine patterned product consisting of only the cured product. The size of the fine patterned product was shown in Table 6.

Example 1-4

Example 1 for Production of Wire-Grid

On the ridges of the fine patterned product with the PET substrate obtained in Example 1-3, aluminum was deposited by an oblique deposition method to form a metal film (thickness: 150 nm, width: 250 nm) on the ridges thereby to obtain a wire-grid polarizer having the PET substrate. The evaluation results are shown in Table 5. Further, the size of the wire-grid is shown in Table 7.

Example 1-5

Example 2 for Production of Fine Patterned Product

As a mold having a concavo-convex structure on its surface, a mold (20 mm square) made of nickel was used. The mold has a concavo-convex structure in a lattice shape (in FIG. 1, M1=150 nm, M2=90 nm, M3=200 nm. The ridges have a length of 10 mm in the depth direction in FIG. 1. The cross sectional shape of the ridges in a direction at a right angle to the longitudinal direction is rectangular) formed in a 10 mm square at the center on its surface.

On the surface of a substrate comprising a quartz substrate (4 inches in diameter) having a thickness of 500 µm, the solution of the photocurable composition 1 was applied (1,000 rpm×10 seconds) by using a spin coater and held in a circulating hot air oven at 90° C. for 1 minute and dried to form a coating film of the photocurable composition 1.

Then, the mold made of nickel was pressed to the coating film of the photocurable composition 1 on the quartz substrate as shown in FIGS. 1 and 2 and pressed as it was under 0.5 MPa (gauge pressure).

Then, at 25° C., a high-pressure mercury lamp was applied for 15 seconds from the quartz substrate side to obtain a cured product of the photocurable composition 1. The mold was separated from the cured product to obtain a fine patterned product having a cured product of the photocurable composition 1 having a concavo-convex structure reverse to the concavo-convex structure of the mold on its surface, formed on the quartz substrate. The thickness of the obtained fine patterned product was 2 µm. Further, it was possible to separate the cured product from the quartz substrate to obtain a fine patterned product consisting of only the cured product. The size of the fine patterned product is shown in Table 6.

Example 1-6

Example 2 for Production of Wire-Grid

On the ridges of the fine patterned product with the quartz substrate obtained in Example 1-5, aluminum was deposited by an oblique deposition method to form a metal film (thickness: 60 nm, width: 60 nm) on the ridges thereby to obtain a wire-grid polarizer having the quartz substrate. The evaluation results are shown in Table 5. Further, the size of the wire-grid is shown in Table 7.

Example 1-7

Example for Preparation of Mold Having Concavo-Convex Structure in Lattice Shape on the Surface of Transparent Fluororesin Layer of Quartz Substrate with Transparent Fluororesin Layer By the method disclosed in Example 4 of WO2006/05980, a quartz substrate (20 mm square) having a transparent fluororesin layer (thickness: 1 µm) comprising a cyclic polymer of 3-oxa-1,6-heptadiene on its surface was produced. Then, the quartz mold used in Example 1-3 was heated to 120° C. and press-bonded on the transparent fluororesin layer side of the quartz substrate under 2.0 MPa (absolute pressure) for 10 minutes. After the temperature of the mold and the quartz substrate was made to be 30° C. or below, the mold was separated.

As a result, a mold having a concavo-convex structure in a lattice shape (in FIG. 1, M1=500 nm, M2=250 nm, M3=350 nm. The ridges have a length of 10 mm in the depth direction in FIG. 1. The cross sectional shape of the ridges at a right angle to the longitudinal direction is rectangular) formed in a 10 mm square at the center on the surface of the transparent fluororesin layer of the quartz substrate, was obtained.

Example 1-8

Example 3 for Production of Fine Patterned Product

On the surface of a substrate made of a highly transparent PET film ("Teijin Tetoron O3" manufactured by Teijin DuPont Films Japan Limited (20 mm×20 mm)) having a thickness of 100 µm, the solution of the photocurable composition 1 prepared in Example 1-1 was applied (1,000 rpm× 10 seconds) by using a spin coater and held in a circulating hot air oven at 90° C. for one minute and dried to form a coating film of the photocurable composition 1.

Then, the mold comprising the quartz substrate with the transparent fluororesin layer prepared in Example 1-7 was pressed to the coating film of the photocurable composition 1 on the PET film as shown in FIGS. 1 and 2 and pressed as it was under 0.5 MPa (gauge pressure).

Then, at 25° C., a high-pressure mercury lamp was applied for 15 seconds from the PET film side to obtain a cured product of the photocurable composition 1. The mold was separated from the cured product to obtain a fine patterned product having a cured product of the photocurable composition 1 having a concavo-convex structure reverse to the concavo-convex structure of the mold on its surface, formed on the PET film. The thickness of the obtained fine patterned product was 1 μm. Further, it was possible to separate the cured product from the PET substrate to obtain a fine patterned product consisting of only the cured product. The size of the fine patterned product was shown in Table 6.

Example 1-9

Example 3 for Production of Wire-Grid

On the ridges of the fine patterned product with the PET substrate obtained in Example 1-8, aluminum was deposited by an oblique deposition method to form a metal film (thickness: 60 nm, width: 250 nm) on the ridges thereby to obtain a wire-grid polarizer having the PET substrate. The evaluation results are shown in Table 5. Further, the size of the wire-grid is shown in Table 7.

Example 1-10

Example 1 for Preparation of Cylindrical Mold
Having Concavo-Convex Structure in Lattice Shape
on the Surface of Transparent Fluororesin Layer By a method described hereinafter, a cylindrical mold precursor having a transparent fluororesin layer (thickness: 1 μm) comprising a cyclic polymer of 3-oxa-1,6-heptadiene on the surface of a pipe (thickness: 1.8 mm, diameter: 30 mm, length: 150 mm) made of an acrylic resin was prepared. First, an antistatic agent (Conisol F-205 manufactured by TE Chemical Co., Ltd.) was diluted 5 times with a mixed solvent of water/isopropanol (1/7 by the mass ratio) to prepare an antistatic agent for coating. The obtained antistatic agent was applied to the pipe made of an acrylic resin while rotating the pipe at a rate of 120 rpm for one minute by a spray coating method and dried by a dryer to form an antistatic layer. The surface tension of the antistatic layer was $10^9 \Omega/\square$.

The "composition 1" disclosed in Example 2 of WO2006/05980 was applied to the antistatic layer while rotating the pipe at a rate of 120 rpm for one minute by a spray coating method and dried by a dryer to form a primer layer.

The "composition 2" disclosed in Example 3 of WO2006/05980 was applied on the primer layer while rotating the pipe at a rate of 120 rpm for 2 minutes by a spray coating method and dried by a dryer. After the surface of the transparent fluororesin layer comprising the cyclic polymer of 3-oxa-1,6-heptadiene no more flowed, the pipe was put in a drying machine and dried at 140° C. for 2 hours to obtain a cylindrical mold precursor. The total thickness of the antistatic layer, the primer layer and the transparent fluororesin layer comprising the cyclic polymer of 3-oxa-1,6-heptadiene was about 1 μm.

As an original mold, a mold (50 mm square) made of nickel was used. The mold has a concavo-convex structure in a lattice shape (distance between ridges: 150 nm, width of ridges: 90 nm, height of ridges: 200 nm. Ridges have a length of 50 mm in the depth direction. The cross sectional shape of ridges in a direction at a right angle to the longitudinal direction is rectangular) formed on the entire surface.

Figure 7:
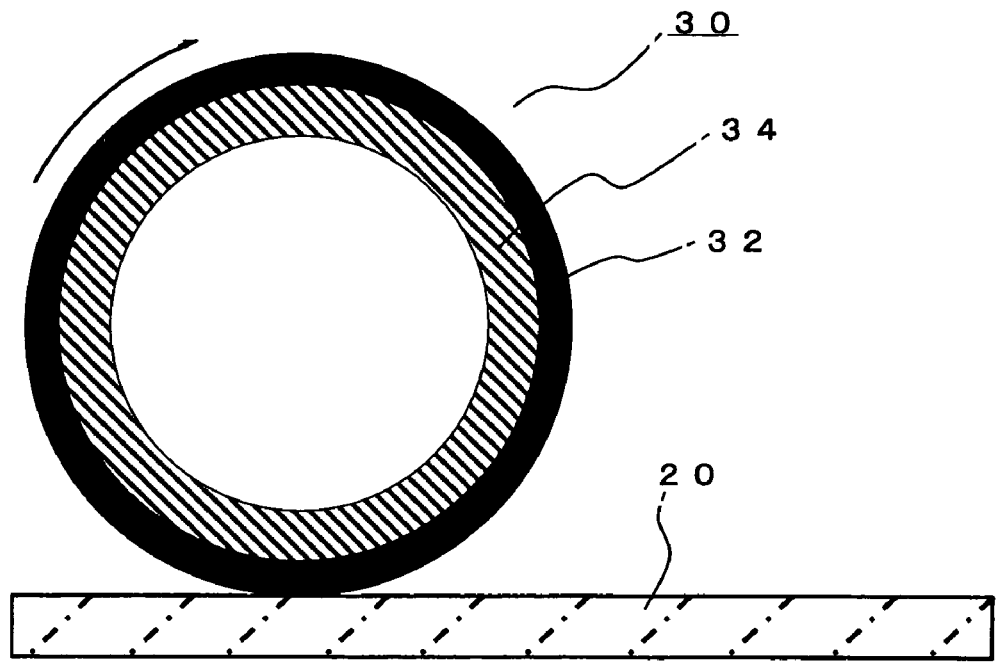
FIG. 7 is a front view illustrating one step in a method for preparing a cylindrical mold in EXAMPLE 1 of the present invention (Example 1-10).
Figure 8:
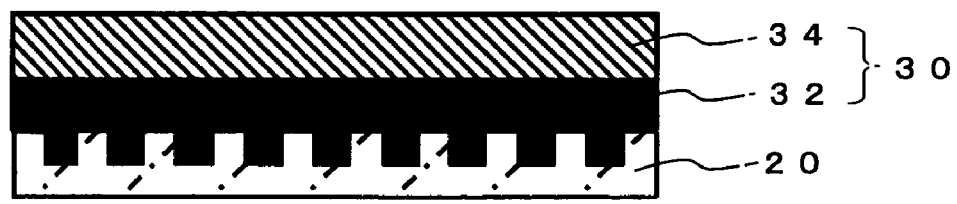
FIG. 8 is an enlarged view illustrating a state where a cylindrical mold precursor 30 is pressed on an original mold 20, observed from a direction of rotation of the cylindrical mold precursor 30.

As shown in FIGS. 7 and 8, the original mold 20 was heated to 150° C. A cylindrical mold precursor 30 was rotated in the longitudinal direction of ridges of the original mold 20 at a rotational speed of 1 rpm in a state where the periphery of the cylindrical mold precursor 30 was pressed to the surface of the original mold 20 under a pressure of about 1.0 MPa. As a result, on the transparent fluororesin layer 32 on the cylindrical mold precursor 30, a pattern which is reverse to the ridges of the original mold 20 was formed, and a cylindrical mold having a pattern layer with no joint was obtained. The distance between the ridges of the cylindrical mold was 150 nm, the width of the ridges was 60 nm, the height of the ridges was 196 nm, and the cross sectional shape in a direction at a right angle to the longitudinal direction of the ridges was rectangular.

Example 1-11

Example 4 for Production of Fine Patterned Product

On the surface of a substrate made of a highly transparent PET film ("Teijin Tetoron O3" manufactured by Teijin DuPont Films Japan Limited (length: 2 m×width: 200 mm)) having a thickness of 100 μm, the solution of the photocurable composition 1 prepared in Example 1-1 was applied by using a die coater and made to pass through a circulating hot air continuous drying furnace at 90° C. over a period of 1 minute to dry the substrate thereby to form a coating film of the photocurable composition 1.

Figure 9:
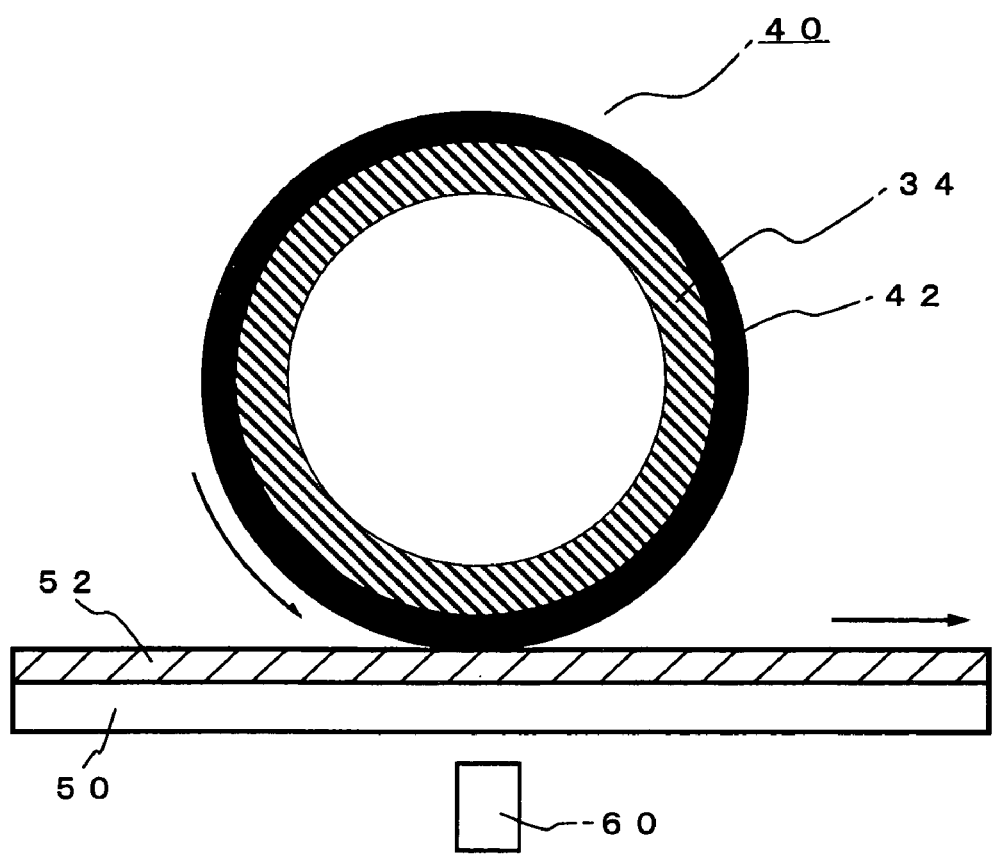
FIG. 9 is a front view illustrating one example of a process for producing a fine patterned product.

As shown in FIG. 9, in a state where the cylindrical mold 40 prepared in Example 1-10 was pressed to a coating film 52 of the photocurable composition 1 at room temperature under a pressure of about 0.1 MPa while rotating it at a rotational speed of 1 rpm, a high-pressure mercury lamp 60 was applied to the coating film 52 from the PET film 50 side for 30 seconds to cure the photocurable composition 1. A fine patterned product having a cured product of the photocurable composition 1 having a concavo-convex structure reverse to the concavo-convex structure of the mold on its surface, formed on the PET film, was obtained. The thickness of the obtained fine patterned product was 1 μm. Further, it was possible to separate the cured product from the PET substrate to obtain a fine patterned product consisting of only the cured product. The size of the fine patterned product was shown in Table 6.

Example 1-12

Example 3 for Production of Wire-Grid

On the ridges of the fine patterned product with the PET substrate obtained in Example 1-11, aluminum was deposited by an oblique deposition method to form a metal film (thickness: 60 nm, width: 90 nm) on the ridges to obtain a wire-grid polarizer having the PET substrate. The evaluation results are shown in Table 5. Further, the size of the wire-grid is shown in Table 7.

Example 1-13

Example 2 for Preparation of Cylindrical Mold
Having Concavo-Convex Structure in Lattice Shape
on the Surface of Transparent Fluororesin Layer In the same manner as in the method disclosed in Example 4 of WO2006/05980, on the surface of a polyimide film ("Kapton 500H" manufactured by DU PONT-TORAY CO., LTD., thickness: 125 μm, length: 630 mm, width: 150 mm), a transparent fluororein layer (thickness: 1 μm) comprising a cyclic polymer of 3-oxa-1,6-heptadiene was formed. Then, the mold made of nickel used in Example 1-10 was heated to 150° C., and press-bonded to the transparent fluororesin layer side of the polyimide film under 2.0 MPa (absolute pressure) for 10 minutes at a position of from 30 to 80 mm from the short side edge and from 50 to 100 mm from the long side edge of the polyimide film. The mold was separated after the temperature of the mold and the polyimide film was made to be 30° C. or below, to form a pattern reverse to the ridges of the mold made of nickel on the transparent fluororesin layer.

The mold made of nickel was heated to 150° C. again, and press-bonded to the transparent fluororesin layer side under 2.0 MPa (absolute pressure) for 10 minutes at a position moved by 55 mm to the longitudinal direction of the polyimide film from the formed concavo-convex pattern. Such a process was further repeated four times to form 6 concavo-convex patterns with a distance of 50 mm in the longitudinal direction on the transparent fluororesin layer of the polyimide film.

The polyimide film was wound on a stainless steel roll having a diameter of 200 mm and a width of 200 mm, and the both ends of the polyimide film was bonded by an adhesive to prepare a cylindrical mold having a pattern on its surface.

Example 1-14

Example 5 for Production of Fine Patterned Product

In the same manner as in Example 1-11, a coating film of the photocurable composition 1 was formed on the surface of a substrate made of a highly transparent PET film ("Teijin Tetoron O3" manufactured by Teijin DuPont Films Japan Limited (length: 2 m×width: 200 mm)) having a thickness of 100 μm.

In the same manner as in Example 1-11 except that the cylindrical mold prepared in Example 1-13 was used, a fine patterned product having a cured product of the photocurable composition 1 having a concavo-convex structure reverse to the concavo-convex structure of the mold on its surface, formed on the PET film, was obtained. The thickness of the obtained fine patterned product was 1 μm. Further, it was possible to separate the cured product from the PET substrate to obtain a fine patterned product consisting of only the cured product. The size of the fine patterned product is shown in Table 6.

Example 1-15

Example 4 for Production of Wire-Grid

On the ridges of the fine patterned product with the PET substrate obtained in Example 1-14, aluminum was deposited by an oblique deposition method to form a metal film (thickness: 60 nm, width: 90 nm) on the ridges thereby to obtain a wire-grid polarizer having the PET substrate. The evaluation results are shown in Table 5. Further, the size of the wire-grid is shown in Table 7.

Example 1-16

Example 3 for Preparation of Cylindrical Mold Having Concavo-Convex Structure in Lattice Shape on the Surface of Transparent Fluororesin Layer In the same manner as in the method disclosed in Example 4 of WO2006/05980, a SUS406 foil (manufactured by Nippon Steel Materials Co., Ltd., 100 mm×100 mm) having a thickness of 75 μm and having a transparent fluororesin layer (thickness: 1 μm) comprising a cyclic polymer of 3-oxa-1,6-heptadiene on its surface was prepared. Then, the mold made of nickel used in Example 1-10 was heated to 150° C. and press-bonded to the center portion of the transparent fluororesin layer of the SUS foil under 2.0 MPa (absolute pressure) for 10 minutes. The mold was separated after the temperature of the mold and the SUS foil was made to be 30° C. or below, to form a pattern reverse to the ridges of the mold made of nickel on the transparent fluororesin layer. Two such SUS foils were prepared.

On the side surface of a magnet roll having a diameter of 100 mm and a width of 200 mm, one of the above SUS foils was bonded so that the direction of the ridges was in parallel with the circumference. The other SUS foil was bonded to a position facing the bonded SUS foil. A cylindrical mold having a pattern on its surface was obtained.

Example 1-17

Example 5 for Production of Fine Patterned Product

In the same manner as in Example 1-11, a coating film of the photocurable composition 1 was formed on the surface of a substrate made of a highly transparent PET film ("Teijin Tetoron O3" manufactured by Teijin DuPont Films Japan Limited (length:2 m×width: 200 mm) having a thickness of 100 μm.

In the same manner as in Example 1-11 except that the cylindrical mold prepared in Example 1-16 was used, a fine patterned product having a cured product of the photocurable composition 1 having a concavo-convex structure reverse to the concavo-convex structure of the mold on its surface, formed on the PET film, was obtained. The thickness of the obtained fine patterned product was 1 μm. Further, it was possible to separate the cured product from the PET substrate to obtain a fine patterned product consisting of only the cured product. The size of the fine patterned product is shown in Table 6.

Example 1-18

Example 5 for Production of Wire-Grid

On the ridges of the fine patterned product with the PET substrate obtained in Example 1-17, aluminum was deposited by an oblique deposition method to form a metal film (thickness: 60 nm, width: 90 nm) on the ridges thereby to obtain a wire-grid polarizer having the PET substrate. The evaluation results are shown in Table 5. Further, the size of the wire-grid is shown in Table 7.

Example 2

Example 2-1

Example for Preparation of Photocurable Composition

A photocurable composition 2 was obtained in the same manner as in Example 1-1 except that blending of starting materials was changed as identified in Table 1. The unit of the blending of the starting materials in Table 1 is gram (g).

Example 2-2

Example for Formation of Cured Film

A cured film was obtained in the same manner as in Example 1-2 except that the photocurable composition 2 was used instead of the photocurable composition 1. The evaluation results are shown in Table 3.

Example 2-3

Example for Production of Fine Patterned Product

A fine patterned product was obtained in the same manner as in Example 1-3 except that the photocurable composition 2 was used instead of the photocurable composition 1. The thickness of the obtained fine patterned product was 1 μm. The size of the fine patterned product is shown in Table 6.

Example 2-4

Example for Production of Wire-Grid

On the ridges of the fine patterned product with the PET substrate obtained in Example 2-3, a metal film (thickness: 150 nm, width: 250 nm) was formed in the same manner as in Example 1-4 to obtain a wire-grid polarizer having the PET substrate. The evaluation results are shown in Table 5. Further, the size of the wire-grid is shown in Table 7.

Example 3

Example 3-1

Example for Preparation of Photocurable Composition

A photocurable composition 3 was obtained in the same manner as in Example 1-1 except that blending of starting materials was changed as identified in Table 1.

Example 3-2

Example for Formation of Cured Film

A cured film was obtained in the same manner as in Example 1-2 except that the photocurable composition 3 was used instead of the photocurable composition 1. The evaluation results are shown in Table 3.

Example 3-3

Example for Production of Fine Patterned Product

A fine patterned product was obtained in the same manner as in Example 1-3 except that the photocurable composition 3 was used instead of the photocurable composition 1. The thickness of the obtained fine patterned product was 1 μm. The size of the fine patterned product is shown in Table 6.

Example 3-4

Example for Production of Wire-Grid

On the ridges of the fine patterned product with the PET substrate obtained in Example 3-3, a metal film (thickness: 150 nm, width: 250 nm) was formed in the same manner as in Example 1-4 to obtain a wire-grid polarizer having the PET substrate. The evaluation results are shown in Table 5. Further, the size of the wire-grid is shown in Table 7.

Example 4

Example 4-1

Example for Preparation of Photocurable Composition

A photocurable composition 4 was obtained in the same manner as in Example 1-1 except that blending of starting materials was changed as identified in Table 1.

Example 4-2

Example for formation of cured film

A cured film was obtained in the same manner as in Example 1-2 except that the photocurable composition 4 was used instead of the photocurable composition 1. The evaluation results are shown in Table 3.

Example 4-3

Example for Production of Fine Patterned Product

A fine patterned product was obtained in the same manner as in Example 1-3 except that the photocurable composition 4 was used instead of the photocurable composition 1. The thickness of the obtained fine patterned product was 1 μm. The size of the fine patterned product is shown in Table 6.

Example 4-4

Example for Production of Wire-Grid

On the ridges of the fine patterned product with the PET substrate obtained in Example 4-3, a metal film (thickness: 150 nm, width: 250 nm) was formed in the same manner as in Example 1-4 to obtain a wire-grid polarizer having the PET substrate. The evaluation results are shown in Table 5. Further, the size of the wire-grid is shown in Table 7.

Example 5

Example 5-1

Example for Preparation of Photocurable Composition

A photocurable composition 5 was obtained in the same manner as in Example 1-1 except that blending of starting materials was changed as identified in Table 1.

Example 5-2

Example for Formation of Cured Film

A cured film was obtained in the same manner as in Example 1-2 except that the photocurable composition 5 was used instead of the photocurable composition 1. The evaluation results are shown in Table 3.

Example 5-3

Example for Production of Fine Patterned Product

As a mold having a concavo-convex structure on its surface, a mold (20 mm square) made of silicon was used. The mold has a concavo-convex structure in a lattice shape (in FIG. 1, M1=200 nm, M2=120 nm, M3=200 nm, the ridges have a length of 10 mm in the depth direction in FIG. 1. The cross sectional shape of the ridges at a right angle to the longitudinal direction is rectangular) formed in a 10 mm square at the center on its surface.

The above mold was immersed in a solution having 1 g of a fluorinated mold release agent (OPTOOL DX manufactured by DAIKIN INDUSTRIES, LTD.) dissolved in 100 g of a fluorinated solvent and left at rest for 10 minutes. The mold was taken out from the solution and left at rest in a constant temperature and humidity chamber at 60° C. under 90% RH for 1 hour. After the temperature of the mold taken out from the chamber returned to room temperature, the mold was immersed in 100 ml of the above fluorinated solvent for 2 hours to rinse an unreacted fluorinated mold release agent away. The mold was taken out from the fluorinate solvent, air-blown and dried in a constant temperature chamber at 60° C. for one hour.

On the surface of a substrate made of a highly transparent PET film ("Teijin Tetoron O3" manufactured by Teijin DuPont Films Japan Limited) (20 mm×20 mm) having a thickness of 100 μm, the solution of the photocurable composition 5 was applied (1,000 rpm×10 seconds) by using a spin coater and held in a circulating hot air oven at 90° C. for one minute and dried to form a coating film of the photocurable composition 5.

Then, a mold made of silicon subjected to mold release treatment was pressed to the coating film of the photocurable composition 5 on the PET film as shown in FIGS. 1 and 2, and pressed as it was under 0.5 MPa (gauge pressure).

Then, at 25° C., a high-pressure mercury lamp was applied from the PET film side for 15 seconds to obtain a cured product of the photocurable composition 5. The mold was separated from the cured product to obtain a fine patterned product having a cured product of the photocurable composition 5 having a concavo-convex structure reverse to the concavo-convex structure of the mold on its surface, formed on the PET film. The thickness of the obtained fine patterned product was 1 μm. Further, it was possible to obtain the cured product from the PET film to obtain a fine patterned product consisting of only the cured product. The size of the fine patterned product was shown in Table 6.

Example 5-4

Example for Production of Wire-Grid

On the ridges of the fine patterned product with the PET substrate obtained in Example 5-3, a metal film (thickness: 150 nm×width: 80 nm) was formed in the same manner as in Example 1-4 to obtain a wire-grid polarizer having the PET substrate. The evaluation results are shown in Table 5. Further, the size of the wire-grid is shown in Table 7.

Example 6

Example 6-1

Example for Preparation of Photocurable Composition

A photocurable composition 6 was obtained in the same manner as in Example 1-1 except that blending of starting materials was changed as identified in Table 1.

Example 6-2

Example for Formation of Cured Film

A cured film was obtained in the same manner as in Example 1-2 except that the photocurable composition 6 was used instead of the photocurable composition 1. The evaluation results are shown in Table 3.

Example 6-3

Example for Production of Fine Patterned Product

As a mold having a concavo-convex structure on its surface, a mold (20 mm square) made of nickel was used. The mold has a concavo-convex structure in an angle shape (the cross sectional shape of the ridges in a direction at a right angle to the longitudinal direction is isosceles triangular having a base of 80 nm and a height of 200 nm. The distance between vertices of adjacent ridges is 80 nm. The ridges have a length of 10 mm in the depth direction in FIG. 1) formed in a 10 mm square at the center on its surface.

On the surface of a substrate made of a highly transparent PET film ("Teijin Tetoron O3" manufactured by Teijin DuPont Films Japan Limited) (20 mm×20 mm) having a thickness of 100 μm, the obtained solution of the photocurable composition 6 was applied (1,000 rpm×10 seconds) by using a spin coater and held in a circulating hot air oven at 90° C. for one minute and dried to form a coating film of the photocurable composition 6.

Then, a mold made of quartz was pressed to the coating film of the photocurable composition 6 on the PET film as shown in FIGS. 1 and 2, and pressed as it was under 0.5 MPa (gauge pressure).

Then, at 25° C., a high-pressure mercury lamp was applied from the PET film side for 15 seconds to obtain a cured product of the photocurable composition 6. The mold was separated from the cured product to obtain a fine patterned product having a cured product of the photocurable composition 6 having a concavo-convex structure reverse to the concavo-convex structure of the mold on its surface, formed on the PET film. The thickness of the obtained fine patterned product was 1 μm. Further, it was possible to separate the cured product from the PET film to obtain a fine patterned product consisting of only the cured product.

Examples 7 to 57

Photocurable compositions 7 to 57 were prepared in the same manner as in Example 1-1 except that blending of starting materials was changed as identified in Tables 1 and 2. The unit of the blending of the starting materials in Table 2 is gram (g). Formation of a cured film was attempted in the same manner as in Example 1-2. Formation of a fine patterned product was attempted in the same manner as in Example 6-3. Physical properties, etc. of the cured films are shown in Tables 3 and 4.

In Examples 32, 38 and 39, no curing reaction was carried out since the photocurable composition gelated, and such is represented by X in Table 4.

In Examples 31, 33, 36, 37, 46 and 51, transfer could not be carried out since the photocurable composition had a high viscosity, and such is represented by Y in Table 4.

In Examples 34, 40 to 45 and 47 to 50, transfer was possible, but cracking occurred in the durability test, and such is represented by Z in Table 4.

In Examples 35 and 43 to 45, transfer was possible, but white turbidity occurred in the durability test, and such is represented by W in Table 4.

TABLE 1

| Ex. | (A) | | | | (B) | | (C) | | (D) | |
|---|---|---|---|---|---|---|---|---|---|---|
| 1 | DPH | 60 | NPG | 40 | B-1 | 30 | C-1 | 1.3 | D-1 | 0.13 |
| 2 | | | | | | 20 | | 1.2 | | 0.12 |
| 3 | | | | | | 10 | | 1.1 | | 0.11 |
| 4 | | | | | | 50 | | 1.5 | | 0.15 |
| 5 | | | | | | 30 | | 1.3 | — | 0 |
| 6 | | | | | | 30 | C-2 | | D-1 | 0.13 |
| 7 | | | | | | 30 | C-3 | | | |
| 8 | | 70 | | 30 | B-1 | 30 | C-1 | 1.3 | | |
| 9 | | 80 | | 20 | | | | | | |
| 10 | | 90 | | 10 | | | | | | |
| 11 | | 50 | | 50 | | | | | | |
| 12 | | 60 | | 40 | B-2 | 10 | | 1.1 | | 0.11 |
| 13 | | | | | | 30 | | 1.3 | | 0.13 |
| 14 | | | | | | 50 | | 1.5 | | 0.15 |
| 15 | | 58 | HD | 42 | B-1 | 30 | | 1.3 | | 0.13 |
| 16 | | 69 | | 31 | | | | | | |
| 17 | | 79 | | 21 | | | | | | |
| 18 | | 89 | | 11 | | | | | | |
| 19 | | 53 | DOD | 47 | B-1 | 30 | | | | |
| 20 | | 64 | | 36 | | | | | | |
| 21 | | 75 | | 25 | | | | | | |
| 22 | | 87 | | 13 | | | | | | |
| 23 | TMP | 53 | NPG | 47 | B-1 | 30 | | | | |
| 24 | | 64 | | 36 | | | | | | |
| 25 | | 75 | | 25 | | | | | | |
| 26 | | 87 | | 13 | | | | | | |
| 27 | TMM3L | 42 | NPG | 58 | B-2 | 30 | | | | |
| 28 | | 53 | | 47 | | | | | | |
| 29 | | 66 | | 34 | | | | | | |
| 30 | | 81 | | 19 | | | | | | |
| 52 | TMPT | 60 | EA-5520 | 40 | B-1 | 30 | C-1 | 1.3 | | |
| 53 | | | | | | | C-4 | 1.5 | | |
| 54 | | 65 | EA-1020 | 35 | B-1 | 10 | C-1 | 1.3 | | |
| 55 | | | | | | 20 | | | | |
| 56 | TMMT | 70 | EA-5520 | 30 | B-1 | 10 | C-1 | 1.3 | | |
| 57 | | | | | | 20 | C-5 | 1.5 | | |

TABLE 2

| Ex. | (A) | | | | (B) | | (C) | | (D) | |
|---|---|---|---|---|---|---|---|---|---|---|
| 31 | DPH | 100 | NPG | 0 | B-1 | 30 | C-1 | 1.3 | D-1 | 0.13 |
| 32 | | 40 | | 60 | | 30 | | | | |
| 33 | | 60 | | 40 | | 70 | | 1.7 | | 0.17 |
| 34 | | 60 | | 40 | — | 0 | | 1 | | 0.1 |
| 35 | | 20 | DCP | 80 | B-1 | 30 | | 1.3 | | 0.13 |
| 36 | | 40 | | 60 | — | 0 | | 1 | | 0.1 |
| 37 | | 60 | | 40 | — | 0 | | | | |
| 38 | TMMT | 46 | NPG | 53 | B-1 | 30 | | 1.3 | | 0.13 |
| 39 | | 42 | | 58 | | 30 | | | | |
| 40 | DPH | 40 | AAE-100 | 60 | — | 0 | | 1 | | 0.1 |
| 41 | | 60 | | 40 | B-1 | 30 | | 1.3 | | 0.13 |
| 42 | | 80 | | 20 | | 30 | | | | |
| 43 | | 90 | C12Ac | 10 | B-1 | 30 | | | | |
| 44 | | 90 | C16Ac | 10 | B-1 | 30 | | | | |
| 45 | | 90 | B18A | 10 | B-1 | 30 | | | | |
| 46 | | 90 | AAE-300 | 10 | B-1 | 30 | | | | |
| 47 | | 40 | | 60 | | 30 | | | | |
| 48 | | 40 | ALE-200 | 60 | — | 0 | | 1 | | 0.1 |
| 49 | | 40 | | 60 | B-2 | 30 | | 1.3 | | 0.13 |
| 50 | | 80 | | 20 | — | 0 | | 1 | | 0.1 |
| 51 | U-15HA | 40 | NPG | 60 | B-2 | 30 | | 1.3 | | 0.13 |

TABLE 3

| | Composition | | | | | Cured film | | | | | |
| --- | --- | --- | --- | --- | --- | --- | --- | --- | --- | --- | --- |
| | | A2/ | | Viscosity | | Refractive | | | Contact angle | | Coefficient |
| | | (A1 + | | | | | | | | After | of linear |
| Ex. | OH | A2) | B/A | 25° C. | 50° C. | index | Haze | Transmittance | Initial | test | expansion |
| 1 | 14.9 | 63.6 | 30 | 119 | — | 1.5002 | 0.2 | 92.8 | 94 | 95 | 50 |
| 2 | 14.9 | 63.6 | 20 | 106 | — | 1.4998 | 0.3 | 92.8 | 94 | 94 | 50 |
| 3 | 14.9 | 63.6 | 10 | 98 | — | 1.4993 | 0.3 | 92.6 | 96 | 92 | 55 |
| 4 | 14.9 | 63.6 | 50 | 137 | — | 1.4989 | 0.1 | 92.9 | 97 | 93 | 50 |
| 5 | 14.9 | 63.6 | 30 | 119 | — | 1.5004 | 0.1 | 92.7 | 90 | 90 | 50 |
| 6 | 14.9 | 63.6 | | 119 | — | 1.5003 | 0.2 | 92.5 | 94 | 92 | 50 |
| 7 | 14.9 | 63.6 | | 119 | — | 1.5003 | 0.2 | 92.3 | 96 | 94 | 55 |
| 8 | 14.9 | 52.9 | | 320 | 89 | 1.5001 | 0.2 | 93 | 98 | 95 | 55 |
| 9 | 19.3 | 39.6 | | 740 | 101 | 1.5 | 0.2 | 92.4 | 96 | 95 | 50 |
| 10 | 24.8 | 22.6 | | 950 | 143 | 1.5003 | 0.2 | 92.6 | 95 | 92 | 50 |
| 11 | 11.3 | 72.4 | | — | 191 | 1.5001 | 0.2 | 92.6 | 95 | 92 | 50 |
| 12 | 14.9 | 63.6 | 10 | 118 | — | 1.5006 | 0.2 | 92.3 | 93 | 94 | 50 |
| 13 | 14.9 | 63.6 | 30 | 104 | — | 1.5001 | 0.2 | 92.5 | 90 | 90 | 45 |
| 14 | 14.9 | 63.6 | 50 | 133 | — | 1.4991 | 0.2 | 92.5 | 93 | 93 | 45 |
| 15 | 31.7 | 64.0 | 30 | 103 | — | 1.4995 | 0.2 | 92.2 | 94 | 91 | 55 |
| 16 | 14.7 | 52.5 | | 300 | 77 | 1.4996 | 0.3 | 92.6 | 96 | 92 | 50 |
| 17 | 19.5 | 39.5 | | 710 | 92 | 1.4992 | 0.1 | 92.9 | 97 | 93 | 50 |
| 18 | 24.8 | 23.3 | | 890 | 165 | 1.4993 | 0.1 | 92.7 | 91 | 90 | 50 |
| 19 | 31.4 | 63.6 | | 72 | — | 1.4995 | 0.2 | 92.5 | 94 | 92 | 50 |
| 20 | 14.9 | 52.6 | | 92 | — | 1.4998 | 0.2 | 92.3 | 96 | 94 | 50 |
| 21 | 19.4 | 39.7 | | 318 | 103 | 1.4999 | 0.3 | 92.6 | 95 | 92 | 50 |
| 22 | 24.7 | 22.8 | | 714 | 120 | 1.4998 | 0.1 | 92.9 | 94 | 93 | 50 |
| 23 | 12.5 | 65.2 | | 54 | — | 1.4995 | 0.2 | 92.7 | 92 | 90 | 55 |
| 24 | 16.5 | 54.3 | | 58 | — | 1.5003 | 0.2 | 92.5 | 94 | 92 | 55 |
| 25 | 21.1 | 41.3 | | 72 | — | 1.5001 | 0.2 | 92.3 | 93 | 94 | 50 |
| 26 | 27.4 | 24.0 | | 728 | 71 | 1.5002 | 0.2 | 92.6 | 93 | 92 | 50 |
| 27 | 50.8 | 79.3 | | 48 | — | 1.5003 | 0.1 | 92.9 | 92 | 93 | 50 |
| 28 | 65.9 | 73.1 | | 53 | — | 1.4999 | 0.1 | 92.7 | 90 | 90 | 50 |
| 29 | 85.0 | 65.3 | | 69 | — | 1.5001 | 0.2 | 92.5 | 94 | 92 | 45 |
| 30 | 108.8 | 55.6 | | 103 | — | 1.5001 | 0.2 | 92.3 | 93 | 94 | 50 |
| 52 | 72.6 | 36.3 | | 380 | 130 | 1.4998 | 0.1 | 92.9 | 95 | 95 | 50 |
| 53 | 72.6 | 36.3 | | 380 | 130 | 1.4998 | 0.2 | 92.8 | 95 | 95 | 50 |
| 54 | 46.9 | 23.4 | 10 | 570 | 180 | 1.5121 | 0.1 | 92.9 | 93 | 95 | 55 |
| 55 | 46.9 | 23.4 | 20 | 640 | 190 | 1.5108 | 0.1 | 92.9 | 93 | 95 | 50 |
| 56 | 60.7 | 30.4 | 10 | 490 | 150 | 1.5001 | 0.1 | 92.9 | 95 | 95 | 60 |
| 57 | 60.7 | 30.4 | 30 | 520 | 160 | 1.4988 | 0.1 | 92.9 | 95 | 95 | 50 |

TABLE 4

| | Composition | | | | | Cured film | | | | | | |
| --- | --- | --- | --- | --- | --- | --- | --- | --- | --- | --- | --- | --- |
| | | A2/ | | Viscosity | | Refractive | | | Contact angle | | Coefficient | |
| | | (A1 + | | | | | | | | After | of linear | |
| Ex. | OH | A2) | B/A | 25° C. | 50° C. | index | Haze | Transmittance | Initial | test | expansion | |
| 31 | 41.0 | 0 | 30 | 6600 | — | | | | | | | Y |
| 32 | 8.3 | 79.7 | 30 | Gelated | | | | | | | | X |
| 33 | 14.9 | 63.6 | 70 | — | 301 | | | | | | | Y |
| 34 | 14.9 | 63.6 | 0 | 93 | — | 1.5008 | 0.1 | 92.7 | 90 | 90 | 120 | Z |
| 35 | 4.8 | 88.3 | 30 | 120 | — | — | 4.7 | 89.6 | 94 | 92 | 55 | W |
| 36 | 10.7 | 73.9 | 0 | 5800 | 970 | | | | | | | Y |
| 37 | 18.1 | 55.8 | 0 | 1100 | 430 | | | | | | | Y |
| 38 | 0.0 | 65.2 | 30 | Gelated | | | | | | | | X |
| 39 | 5.1 | 65.8 | 30 | Gelated | | | | | | | | X |
| 40 | — | 0 | 0 | 8 | — | 1.5008 | 0.3 | 92.1 | 94 | 78 | 370 | Z |
| 41 | — | 0 | 30 | 14 | — | 1.5004 | 0.1 | 92.3 | 92 | 73 | 280 | Z |
| 42 | — | 0 | 30 | 76 | — | 1.5002 | 0.1 | 92.7 | 91 | 70 | 240 | Z |
| 43 | — | 0 | 30 | — | 164 | — | 5.8 | 88.3 | 92 | 92 | 180 | W |
| 44 | — | 0 | 30 | — | 162 | — | 5.4 | 88.4 | 96 | 94 | 150 | W |
| 45 | — | 0 | 30 | — | 151 | — | 5.9 | 87.6 | 95 | 92 | 210 | W |
| 46 | — | 0 | 30 | 4300 | 540 | | | | | | | Y |
| 47 | — | 0 | 30 | 130 | — | 1.5012 | 0.2 | 92.7 | 92 | 90 | 240 | Z |
| 48 | — | 0 | 0 | 10 | — | 1.5009 | 0.2 | 92.1 | 94 | 92 | 180 | Z |
| 49 | — | 0 | 30 | 23 | — | 1.5003 | 0.2 | 92.3 | 93 | 94 | 160 | Z |

TABLE 4-continued

| | | Composition | | | | Cured film | | | Contact angle | | | |
|---|---|---|---|---|---|---|---|---|---|---|---|---|
| | | A2/ | | | | | | | | | | |
| | | (A1 + | | Viscosity | | Refractive | | | | After | Coefficient of linear | |
| Ex. | OH | A2) | B/A | 25° C. | 50° C. | index | Haze | Transmittance | Initial | test | expansion | |
| 50 | — | 0 | 0 | 88 | — | 1.5009 | — | — | — | — | — | Z |
| 51 | ~0 | — | 30 | — | 8000 | | — | — | — | — | — | Y |

TABLE 5

| | Tp | Rs | ER |
|---|---|---|---|
| Ex. 1-4 | >30 | >42 | >300 |
| Ex. 1-6 | >38 | >42 | >500 |
| Ex. 1-9 | >30 | >42 | >300 |
| Ex. 1-12 | >30 | >42 | >300 |
| Ex. 1-15 | >30 | >42 | >300 |
| Ex. 1-18 | >30 | >42 | >300 |
| Ex. 2-4 | >30 | >42 | >300 |
| Ex. 3-4 | >30 | >42 | >300 |
| Ex. 4-4 | >30 | >42 | >300 |
| Ex. 5-4 | >34 | >42 | >500 |

TABLE 6

| | Distance between ridges L1/nm | Width of ridges L2/nm | Height of ridges L3/nm |
|---|---|---|---|
| Ex. 1-3 | 500 | 250 | 345 |
| Ex. 1-5 | 150 | 60 | 196 |
| Ex. 1-8 | 500 | 250 | 345 |
| Ex. 1-11 | 150 | 90 | 196 |
| Ex. 1-14 | 150 | 90 | 196 |
| Ex. 1-17 | 150 | 90 | 196 |
| Ex. 2-3 | 500 | 250 | 345 |
| Ex. 3-3 | 500 | 250 | 345 |
| Ex. 4-3 | 500 | 250 | 345 |
| Ex. 5-3 | 200 | 80 | 196 |

TABLE 7

| | Ridges | | | Fine metallic wires | |
|---|---|---|---|---|---|
| | Pitch Pp/nm | Width Dp/nm | Height Hp/nm | Width Dm/nm | Height Hm/nm |
| Ex. 1-4 | 500 | 250 | 345 | 250 | 150 |
| Ex. 1-6 | 150 | 60 | 196 | 60 | 60 |
| Ex. 1-9 | 500 | 250 | 345 | 250 | 60 |
| Ex. 1-12 | 150 | 90 | 196 | 60 | 60 |
| Ex. 1-15 | 150 | 90 | 196 | 60 | 60 |
| Ex. 1-18 | 150 | 90 | 196 | 60 | 60 |
| Ex. 2-4 | 500 | 250 | 345 | 250 | 150 |
| Ex. 3-4 | 500 | 250 | 345 | 250 | 150 |
| Ex. 4-4 | 500 | 250 | 345 | 250 | 150 |
| Ex. 5-4 | 200 | 80 | 196 | 80 | 150 |

INDUSTRIAL APPLICABILITY

According to the present invention, a fine patterned product having a cured product layer having a fine pattern, useful as an optical element such as a microlens array, an optical waveguide element, an optical switching element, a Fresnel zone plate, a binary optical element, a blaze optical element or a photonic crystal, an antireflection member, a biochip member, a microreactor chip member, a catalyst support, etc., can efficiently be produced.

Particularly, it is possible to produce a wire-grid polarizer with high productivity.

The entire disclosures of Japanese Patent Application No. 2007-255416 filed on Sep. 28, 2007 and Japanese Patent Application No. 2007-306402 filed on Nov. 27, 2007 including specifications, claims, drawings and summaries are incorporated herein by reference in their entireties.

What is claimed is:

1. A fine pattern molded product, comprising a cured product obtained by photocuring a photocurable composition on a fine pattern of a mold having the fine pattern on its surface; wherein:

prior to the photocuring, the viscosity of the photocurable composition containing substantially no solvent at 50° C. is from 1 to 200 mPa/s;

the fine pattern comprises a pattern of recesses and protrusions repeatedly formed on the surface of the product; and the pattern of recess and protrusions is characterized by an average distance between adjacent protrusions in the range of 10 nm to 10 μm, an average protrusion width in the range of 10 nm to 5 μm, and an average protrusion height in the range of 10 nm to 10 μm; and wherein the photocurable composition comprises a photocurable monomer (A), a colloidal silica (B) having an average particle size of at most 200 nm and a photopolymerization initiator (C) in contents of the colloidal silica (B) (solid content) of from 5 to 60 parts by mass and the photopolymerization initiator (C) of from 0.1 to 10 parts by mass per 100 parts by mass of the photocurable monomer (A), wherein the photocurable monomer (A) comprises at least the following multifunctional monomer (A1) and the following bifunctional monomer (A2); and at least one compound belonging to the multifunctional monomer (A1) or the bifunctional monomer (A2) has a hydroxy group, and the ratio of the total amount (mol) of the hydroxy groups to the total amount (mol) of the multifunctional monomer (A1) and the bifunctional monomer (A2) is at least 10%:

multifunctional monomer (A1): a compound having at least 3(meth)acryloyloxy groups in one molecule;

bifunctional monomer (A2): a compound having two (meth)acryloyloxy groups in one molecule.

2. An optical element comprising the fine pattern molded product as defined in claim 1.

3. The optical element according to claim 2, which is a wire-grid polarizer.

4. A process for producing a fine pattern molded product, which comprises sandwiching and pressing a photocurable composition between a fine pattern surface of a mold having the fine pattern on its surface and a substrate (step A), curing the photocurable composition by irradiation with light to form a fine pattern molded product comprising a cured product having a surface on which the fine pattern of the mold is transferred (step B), and separating at least one of the mold and the substrate from the cured product to obtain a fine pattern molded product, a fine pattern molded product integrated with the substrate, or a fine pattern molded product integrated with the mold (step C); and wherein the photocurable composition comprises a photocurable monomer (A), a colloidal silica (B) having an average particle size of at most 200 nm and a photopolymerization initiator (C) in contents of the colloidal silica (B) (solid content) of from 5 to 60 parts by mass and the photopolymerization initiator (C) of from 0.1 to 10 parts by mass per 100 parts by mass of the photocurable monomer (A), wherein the photocurable monomer (A) comprises at least the following multifunctional monomer (A1) and the following bifunctional monomer (A2); and at least one compound belonging to the multifunctional monomer (A1) or the bifunctional monomer (A2) has a hydroxy group, and the ratio of the total amount (mol) of the hydroxy groups to the total amount (mol) of the multifunctional monomer (A1) and the bifunctional monomer (A2) is at least 10%:

multifunctional monomer (A1): a compound having at least 3(meth)acryloyloxy groups in one molecule;

bifunctional monomer (A2): a compound having two (meth)acryloyloxy groups in one molecule.

5. A fine pattern molded product produced by the production process as defined in claim 4.

6. An optical element comprising the fine pattern molded product as defined in claim 5.

7. The optical element of claim 6, wherein
prior to curing, the viscosity of the photocurable composition containing substantially no solvent at 50° C. is from 1 to 200 mPa/s;

the fine pattern comprises a pattern of recesses and protrusions repeatedly formed on the surface of the product; and the pattern of recess and protrusions is characterized by an average distance between adjacent protrusions in the range of 10 nm to 10 µm, an average protrusion width in the range of 10 nm to 5 µm, and an average protrusion height in the range of 10 nm to 10 µm.

8. The optical element according to claim 6, which is a wire-grid polarizer.

9. The fine pattern molded product of claim 5, wherein:
prior to curing, the viscosity of the photocurable composition containing substantially no solvent at 50° C. is from 1 to 200 mPa/s;

the fine pattern comprises a pattern of recesses and protrusions repeatedly formed on the surface of the product; and the pattern of recess and protrusions is characterized by an average distance between adjacent protrusions in the range of 10 nm to 10 µm, an average protrusion width in the range of 10 nm to 5 µm, and an average protrusion height in the range of 10 nm to 10 µm.

* * * * *